(12) United States Patent
Yeo et al.

(10) Patent No.: US 12,372,707 B2
(45) Date of Patent: *Jul. 29, 2025

(54) EDGELIT LIGHT FIXTURE WITH OPTICALLY TRANSMISSIVE COMPONENT FOR IMPROVED APPEARANCE OF LIGHTGUIDE INPUT REGION

(71) Applicant: Fusion Optix, Inc., Woburn, MA (US)

(72) Inventors: Terence Yeo, Boston, MA (US); Timothy Kelly, Brookline, MA (US); Michael Demas, Charlestown, MA (US)

(73) Assignee: Fusion Optix, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,957

(22) Filed: Oct. 7, 2022

(65) Prior Publication Data

US 2023/0029729 A1    Feb. 2, 2023

Related U.S. Application Data

(63) Continuation of application No. 17/693,226, filed on Mar. 11, 2022, now Pat. No. 12,055,747, which is a continuation-in-part of application No. 17/476,212, filed on Sep. 15, 2021, now Pat. No. 11,543,582, which is a continuation of application No.
(Continued)

(51) Int. Cl.
| | |
|---|---|
| *F21V 8/00* | (2006.01) |
| *F21S 8/02* | (2006.01) |
| *F21V 7/00* | (2006.01) |
| *F21Y 105/00* | (2016.01) |
| *F21Y 115/10* | (2016.01) |

(52) U.S. Cl.
CPC ............ *G02B 6/0055* (2013.01); *F21S 8/024* (2013.01); *F21S 8/026* (2013.01); *F21V 7/0016* (2013.01); *F21Y 2105/00* (2013.01); *F21Y 2115/10* (2016.08)

(58) Field of Classification Search
CPC ........ G02B 6/0055; F21S 8/024; F21S 8/026; F21V 7/0016; F21Y 2115/10; F21Y 2105/00
See application file for complete search history.

(56) References Cited

U.S. PATENT DOCUMENTS

2018/0216791 A1* 8/2018 Leung .................... F21V 14/02

* cited by examiner

*Primary Examiner* — Abdulmajeed Aziz
*Assistant Examiner* — Jessica M Apenteng

(57) ABSTRACT

A optically transmissive component is configured within a light fixture to provide benefits in brightness uniformity and visual appearance with the use of a light scattering extension portion that provides light scattering of light emitted from near an input edge of a light guide or other edgelit optical element. The sequential propagation of light through both the extension portion and main portion of the optically transmissive component significantly reduces the higher brightness and uneven "hotspotting" type visual defects typically produced near the input edge of an edgelit optical system. With appearance constraints removed or reduced, edgelit light fixtures with higher output, higher efficacy, and/or simplified edgelit optical components are enabled. Embodiments include the use of the extension portion of the optically transmissive component extension to mechanically position and retain an edgelit optical element within a light fixture.

28 Claims, 27 Drawing Sheets

FIG. 2B Enlargement

Related U.S. Application Data

17/107,941, filed on Nov. 30, 2020, now Pat. No. 11,163,104, which is a continuation-in-part of application No. 16/039,320, filed on Jul. 18, 2018, now Pat. No. 10,852,466, said application No. 17/693,226 is a continuation-in-part of application No. 16/877,482, filed on May 18, 2020, now Pat. No. 11,396,751, which is a continuation-in-part of application No. 16/239,804, filed on Jan. 4, 2019, now abandoned.

(60) Provisional application No. 62/534,187, filed on Jul. 18, 2017, provisional application No. 62/849,199, filed on May 17, 2019, provisional application No. 63/000,649, filed on Mar. 27, 2020, provisional application No. 63/000,718, filed on Mar. 27, 2020.

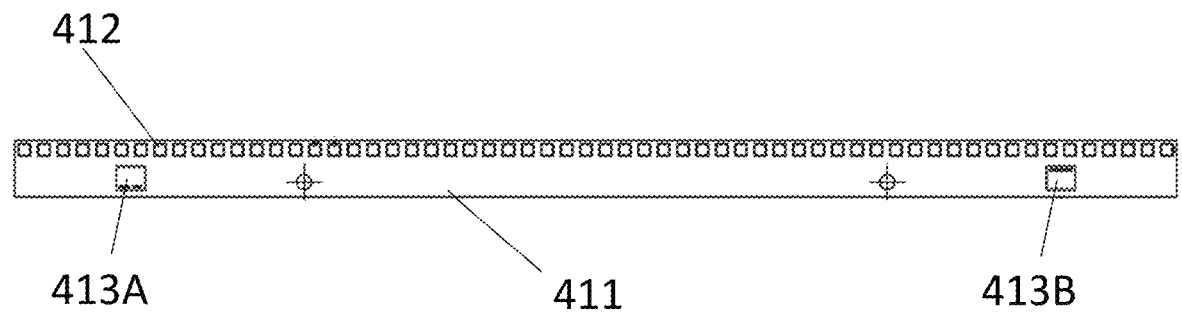
FIG. 4Ai
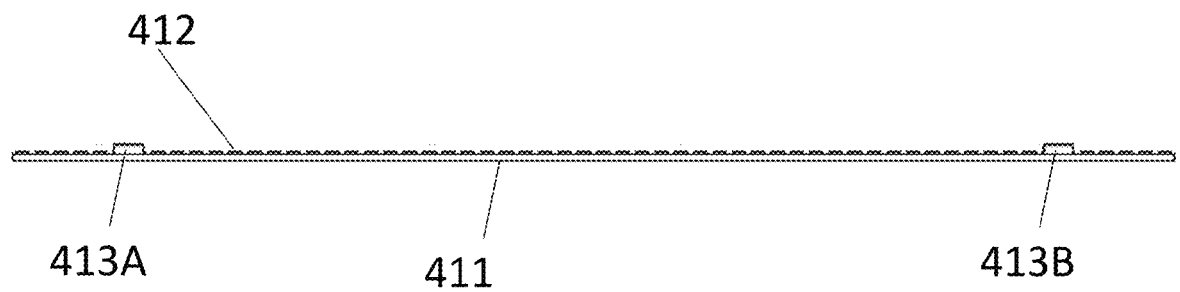
FIG. 4Aii
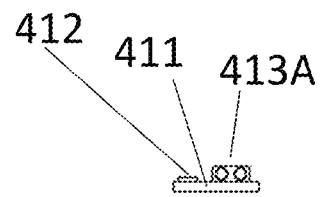
FIG. 4Aiii

100% LED Board B     75:25     50:50

25:75     100% LED Board A (i) Diffuse Planar (No surface features)

(ii) Diffuse laser etched (iii) Diffuse prism (iv) Diffuse sawtooth (v) Diffuse layer (laminated)

(vi) Diffuse surface (coated)

(vii) Diffuse patterned

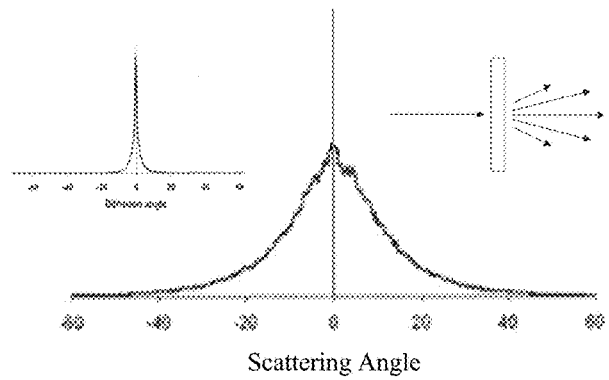

Scattering Angle

| Sample | Type | Height | ASTM D1003 | | | Scattering (FWHM) | | Gloss (60%) | |
|---|---|---|---|---|---|---|---|---|---|
| | | | T% | H% | C% | TD | MD | Side A | Side B |
| Clear Etched Light Guide | | 4.5mm | 89.4 | 12.5 | 98.6 | 1° | 1° | 129.9 | 110.2 |
| Edge-lit Signage Acrylic | | 4.0mm | 92.6 | 4.1 | 99.8 | 1° | 1° | 139.7 | 140.5 |
| (i) | Diffuse planar | 4.7mm | 90.6 | 97.1 | 9.1 | 10° | 16° | 62.4 | 63.5 |
| (ii) | Diffuse laser etched | 4.5mm | 92.8 | 94.5 | 3.7 | 20° | 18° | 85.7 | 64.3 |
| (iii) | Diffuse lenticular | 4.6mm | 86.9 | 92.3 | 23.6 | 25° | 2° | 86.5 | 11.9 |
| (iv-a) | Diffuse sawtooth | 4.4mm | 82.6 | 97.6 | 4.3 | 5° | 17° | 74.7 | 5.9 |
| (iv-b) | Diffuse sawtooth | 3.8mm | 91.7 | 84.9 | 13.0 | 5° | 17° | 78.5 | 5.9 |
| (iv-c) | Diffuse sawtooth | 4.8mm | 91.6 | 80.2 | 17.8 | 5° | 17° | 74.7 | 5.9 |
| (v-a) | Diffuse layer (laminated) | 4.6mm | 91.5 | 86.3 | 15.2 | 11° | 10° | 88.4 | 55.6 |
| (v-b) | Diffuse layer (laminated) | 4.6mm | 90.2 | 90.6 | 7.3 | 15° | 14° | 90.2 | 45.2 |
| (v-c) | Diffuse layer (laminated) | 4.6mm | 92.0 | 94.1 | 3.9 | 30° | 30° | 87.6 | 34.5 |
| (v-d) | Diffuse layer (laminated) | 4.6mm | 86.8 | 94.9 | 5.6 | 40° | 30° | 85.7 | 86.1 |
| (vi-a) | Diffuse surface (coated) | 4.5mm | 93.0 | 95.1 | 3.6 | 20° | 18° | 91.1 | 6.3 |
| (vi-b) | Diffuse surface (coated) | 4.5mm | 89.8 | 100 | 2.3 | 40° | 40° | 92.4 | 4.3 |

FIG. 12B

| Reflector | Reflectance | | | | | Yellowness Index |
|---|---|---|---|---|---|---|
| | Y(D65) | x(D65) | y(D65) | u'(D65) | v'(D65) | YI(E313-96)(D65) |
| Black Powder Coat SCI | 4.73 | 0.3112 | 0.3272 | 0.1975 | 0.4671 | -1.75 |
| Black Powder Coat SCE | 2.52 | 0.3074 | 0.3244 | 0.1958 | 0.465 | -5.64 |
| Specular Component (SCI - SCE) | 2.21 | 0.0038 | 0.0028 | 0.0017 | 0.0021 | 3.89 |
| White Powder Coat SCI | 83.07 | 0.3112 | 0.3281 | 0.1971 | 0.4676 | -1.48 |
| White Powder Coat SCE | 79.57 | 0.3114 | 0.3283 | 0.1972 | 0.4677 | -1.27 |
| Specular Component (SCI - SCE) | 3.5 | -0.0002 | -0.0002 | -1E-04 | -1E-04 | -0.21 |
| Gray Powder Coat SCI | 30.89 | 0.2981 | 0.3181 | 0.1917 | 0.4602 | -15.05 |
| Gray Powder Coat SCE | 29.77 | 0.2983 | 0.3182 | 0.1918 | 0.4603 | -14.84 |
| Specular Component (SCI - SCE) | 1.12 | -0.0002 | -0.0001 | -0.0001 | -0.0001 | 0.25 |
| White Reflector Film A SCI | 96.77 | 0.3117 | 0.3283 | 0.1974 | 0.4678 | -0.97 |
| White Reflector Film A SCE | 91.28 | 0.312 | 0.3286 | 0.1975 | 0.468 | -0.68 |
| Specular Component (SCI - SCE) | 5.49 | -0.0003 | -0.0003 | -0.0001 | -0.0002 | -0.29 |
| White Reflector Film B SCI | 96.55 | 0.3151 | 0.3326 | 0.1982 | 0.4706 | - |
| White Reflector Film B SCE | 89.51 | 0.3125 | 0.3292 | 0.1976 | 0.4684 | -0.11 |
| Specular Component (SCI - SCE) | 7.04 | 0.0026 | 0.0034 | 0.0006 | 0.0022 | - |
| White Reflector Film C matte side SCI | 95.77 | 0.3129 | 0.3302 | 0.1975 | 0.469 | 0.51 |
| White Reflector Film C matte side SCE | 93.8 | 0.3133 | 0.3305 | 0.1977 | 0.4692 | 0.92 |
| Specular Component (SCI - SCE) | 1.97 | -0.0004 | -0.0003 | -0.0002 | -0.0002 | -0.41 |
| White Reflector Film C gloss side SCI | 95.34 | 0.3131 | 0.3307 | 0.1975 | 0.4693 | 0.81 |
| White Reflector Film C gloss side SCE | 93.28 | 0.3131 | 0.3306 | 0.1975 | 0.4692 | 0.84 |
| Specular Component (SCI - SCE) | 2.06 | 0 | 1E-04 | 0 | 1E-04 | -0.03 |
| Specular Al reflector SCI | 93.6 | 0.3124 | 0.3288 | 0.1977 | 0.4682 | -0.31 |
| Specular Al reflector SCE | 5.12 | 0.3041 | 0.3116 | 0.1984 | 0.4574 | -13.09 |
| Specular Component (SCI - SCE) | 88.48 | 0.0083 | 0.0172 | -0.0007 | 0.0108 | 12.78 |

EDGELIT LIGHT FIXTURE WITH OPTICALLY TRANSMISSIVE COMPONENT FOR IMPROVED APPEARANCE OF LIGHTGUIDE INPUT REGION

SUMMARY

Light fixture embodiments provide benefits of increased light output, uniformity of brightness and color by use of novel edge-lit optical elements that functions simultaneously as a diffuser and direct throughput lens, as well as an outcoupling TIR light guide. Embodiments are provided that comprise mounting of the light fixture into the grid without impacting the plenum requirements. Provided are typical benefits of an edge-lit light guide design including shallow depth, extended emitting area, and off axis light distributions such as asymmetric and symmetric batwing distributions particularly useful in downlighting and other lighting applications. Additionally, area dedicated to bezels or edge reflectors can greatly improve appearance due to reduced or eliminated hotspotting and bright edges to provide a fixture face with very high percentage of light emitting area. Some embodiments can be configured as direct/indirect light fixtures which are suspended below the ceiling grid. Suspended ceiling grid systems are particularly common in indoor office, education and retail spaces. Typically ceiling grid systems comprise T-Bars with vertical and horizontal portions that are supporting lightweight functional or decorative ceiling tiles, panels or other members. Ceiling tiles or panels are typically made with mineral wool, fiberglass, gypsum, perlite, clay, melamine acoustic foam, cellulose or starch. Metal, glass and wood are also used as specialty materials. When placed in the ceiling grid, they provide some thermal insulation but are usually designed to improve the aesthetics and acoustics of a room. In addition to be structurally functional, T-bars are themselves part of the aesthetic appearance of the ceiling grid system. Commonly the horizontal portion of a T-bar is 9/16", 15/16" or 1.5" wide and typically is configured in a flat or "slot and bolt" configuration although other styles are also popular. The height of a T-bar is also typically between 1" and 2" with the main beam T-bars being taller than cross beam T-bars.

BACKGROUND

Edge-lit lighting systems typically incorporating optical waveguides, also referred to as light guides, positioned close to the light source provide significant benefits such as thin form factor and adjustable lighting output. However, efficient optical coupling from the light source to the waveguide is difficult to achieve and typically 10% to 30% of light is lost. It is also conventionally difficult to control the light distributions from the waveguide and difficult to produce narrow width light fixtures without low efficacy and/or non-uniform visual appearance. A particular problem with such systems is an unwanted artifact called "hotspotting" or "headlamping" along the edges of the waveguides which is due to light from adjacent LEDs being insufficiently mixed together before exiting the waveguide.

BRIEF DESCRIPTION OF DRAWINGS

FIGS. 4Ai, 4Aii, and 4Aiii show top, side, and end views of a typical LED board used in light fixture embodiments and the testing shown in FIGS. 4B-C and 5A-B.

FIG. 12B is a table of optical properties of edge-lit optical elements used in light fixture embodiments FIG. 13A is table of quantitative reflectance data for various reflectors used in light fixture embodiments.

DETAILED DESCRIPTION

Figure 1A:
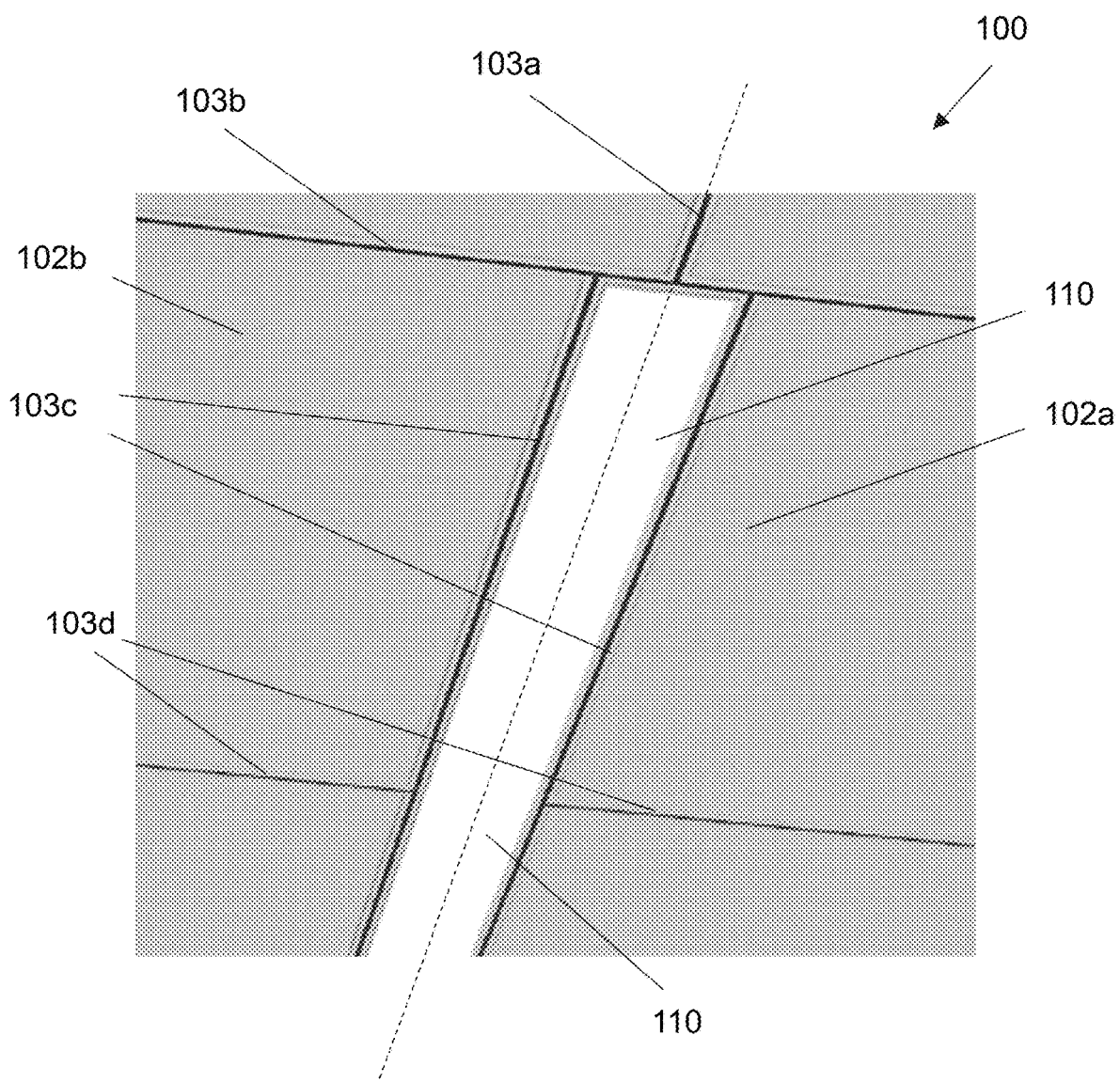
FIG. 1A is perspective view of a light fixture embodiment mounted into a ceiling grid.

Although some modes of carrying out the present disclosure have been disclosed, those skilled in the art would recognize that other embodiments for carrying out or practicing the present disclosure are also possible. Furthermore, The accompanying drawings are not intended to be drawn to scale. In the drawings, each identical or nearly identical component that is illustrated in various figures is represented by a like numeral. For purposes of clarity, not every component may be labeled in every drawing. Labeled items of illustrated light fixture embodiments are as follows after FIG. 1A and FIG. 1B wherein "XX" indicates the Figure number;

100 Ceiling Grid System
101 Ceiling Grid Plane
102 Ceiling panels or ceiling tiles
103 T-Bar
104 T-Bar Height ("Zero Plenum Height")
105 T-Bar Horizontal Portion
106 T-Bar Vertical Portion
107 T-Bar Anchor
108 T-Bar mounting slot
109 T-Bar separation bracket
120 Suspension Cable or Wire
140 Power Source/Driver
160 Utility Component
422 Electrical Channel/Arranged Electrical Circuit/Addressable Circuit
730 Positioning component/spacer/spring clip/gasket
1132 Gasket
XX00 Light fixture
XX01 Elongate fixture body
XX02 Fixture body side portion
XX03 Bezel or feature on fixture body side portion
XX04 T-Bar Feature on fixture body side portion
XX05 Fixture body backplane
XX06 Non-optical cavity/Wiring Cavity in fixture body
XX07 Fixture end plate
XX08 End plate feature
XX09 Fixture mounting hardware (e.g. bracket, clip, spring)
XX10 Light fixture output face or window
XX11 Printed Circuit Board (PCB)
XX12 Light Emitting Diode (LED)
XX13 Electrical Connector
XX14 Optical Element
XX14A Optical element input face
XX14B Optical element output face
XX14C Optical element inner face
XX14D Optical element light scattering layer
XX14E Optical element clear region
XX14F Optical element end face
XX15 Reflector or reflective surface
XX16 Cover lens/Optically Transmitting Component
XX17 Optical Cavity
XX18X Optical ray(s)/Optical interaction region
XX19 Optical Element Light Distribution
XX20 Screw Boss Embodiment configurations can be implemented in a wide range of light fixtures. Typical light fixture embodiments include LEDs as light sources and although the written descriptions may reference LED in the singular, typically an array of LEDS is used and should be implied if not explicitly stated or illustrated. Many types of reflectors may be used in various embodiments such as diffuse or specular reflectors or reflectors with surface features for redirection of incident light. Optical elements may be lit from one side, so called "single edge-lit", or two sides "double edge-lit", and may contain surface features for purposes of light outcoupling, light redirection, or visual appearance.

Typically, an optical element comprises at least one of: a light guide, an edge-lit diffuser, a direct lit diffuser, a reflector, a refractive lens, a diffractive lens. As represented, a light guide is an optical element which has one or more input faces along its edges into which light from a light source enters and utilizes internal reflection to propagate a portion of light within the optical element by multiple internal reflections while simultaneously outcoupling a portion of light, typically light guides have high transmission (>90%), low haze (<1%) and high clarity (>99%). An edge-lit diffuser is also lit from one or more of its edges but its primary function is to diffuse or scatter any light that enters into its bulk material. An edge-lit diffuser significantly has much lower clarity than a light guide (typically less than 50%) and much higher haze (typically more than 50%). The edge-lit diffuser can further comprise a combination of internal light scattering and light redirecting surface features. The light redirecting features may be regular, such as lines or ridges, or could be a random pattern. Edge-lit diffusers also typically have much high lower levels of surface gloss than light guides. This is because the outer surfaces are not required to allow total internal reflection as is the case with light guide materials. In other embodiments, the optical element can be implemented as a bent mirror that reflects light incident thereon along a first path (and at a first angle) along a second path (and at a second angle) different from the first path. A direct lit diffuser is another optical element wherein light is incident upon the largest area face of the optical element and light is transmitted through the direct lit diffuser lens that scatters light, diffuses light or enables reduction in intensity of light.

The optical elements provided are typically comprised of a light transmissive material having a refractive index greater than the surrounding ambient environment; in the case of air>1. Optionally, regions of differing refractive index may be dispersed within the volume to scatter light and cause a portion of light to out couple from the optical element. Embodiments highlight include those comprised of PMMA acrylic matrix with PMMA beads of differing refractive index dispersed throughout the volume. Other alternative materials for an optical element include but are not limited to clear or translucent grades of polycarbonate, cyclic olefin copolymers, silicone, and glass. PMMA acrylic has a refractive index of approximately 1.5 which in air produces a total internal reflection (TIR) critical angle of approximately 42 degrees. Dispersed light scattering regions within the optical element can be achieved by dispersing materials of differing refractive index throughout the material. Alternatively, $2^{nd}$ phase regions can be formed in-situ during processing of immiscible material blends. Arrays of surface features can also be used such as a linear lenticular or prism array which is often a suitable pattern.

Fixture embodiments that benefit from advantages in aesthetic appearance, light distribution pattern, and luminous efficacy are provided.

FIG. 1A illustrates a ceiling grid system 100 incorporating a light fixture embodiment 100a installed above the ceiling grid plane in a direct lit downlighting application. The light fixture 100a is linear and approximately 4 inches wide. The light fixture is mounted recessed into the ceiling grid systems so as its output face 110 is flush with 2 ft×2 ft ceiling tiles 102a and 102b in a ceiling grid system 100 which define the ceiling grid plane. The light fixture is supported longitudinally between two T-bars 103c and is positioned in-line with a T-bar 103a at its end such that the longitudinal axis of the light fixture is the same as the longitudinal axis of the T-bar 103a, this is illustrated by the dotted line. Also illustrated is a mounting T-bar 103b positioned at the end of the light fixture and two further T-bars 103d aligned perpendicularly with the sides of the light fixture housing body and connected to the fixture so as to maintain structural properties of the ceiling grid system and support ceiling panels. Suspended ceiling grid systems are particularly common in indoor office, education and retail spaces. Typically ceiling grid systems comprise T-Bars with vertical and horizontal portions that are supporting lightweight functional or decorative ceiling tiles, panels or other members. Ceiling tiles or panels are typically made with mineral wool, fiberglass, gypsum, perlite, clay, melamine acoustic foam, cellulose or starch. Metal, glass and wood are also used as specialty materials. When placed in the ceiling grid, they provide some thermal insulation but are usually designed to improve the aesthetics and acoustics of a room. In addition to be structurally functional, T-bars are themselves part of the aesthetic appearance of the ceiling grid system. Commonly the horizontal portion of a T-bar is 9/16", 15/16" or 1.5" wide and typically is configured in a flat or "slot and bolt" configuration although other styles are also popular. The height of a T-bar is also typically between 1" and 2" with the main beam T-bars being taller than cross beam T-bars.

Figure 1B:
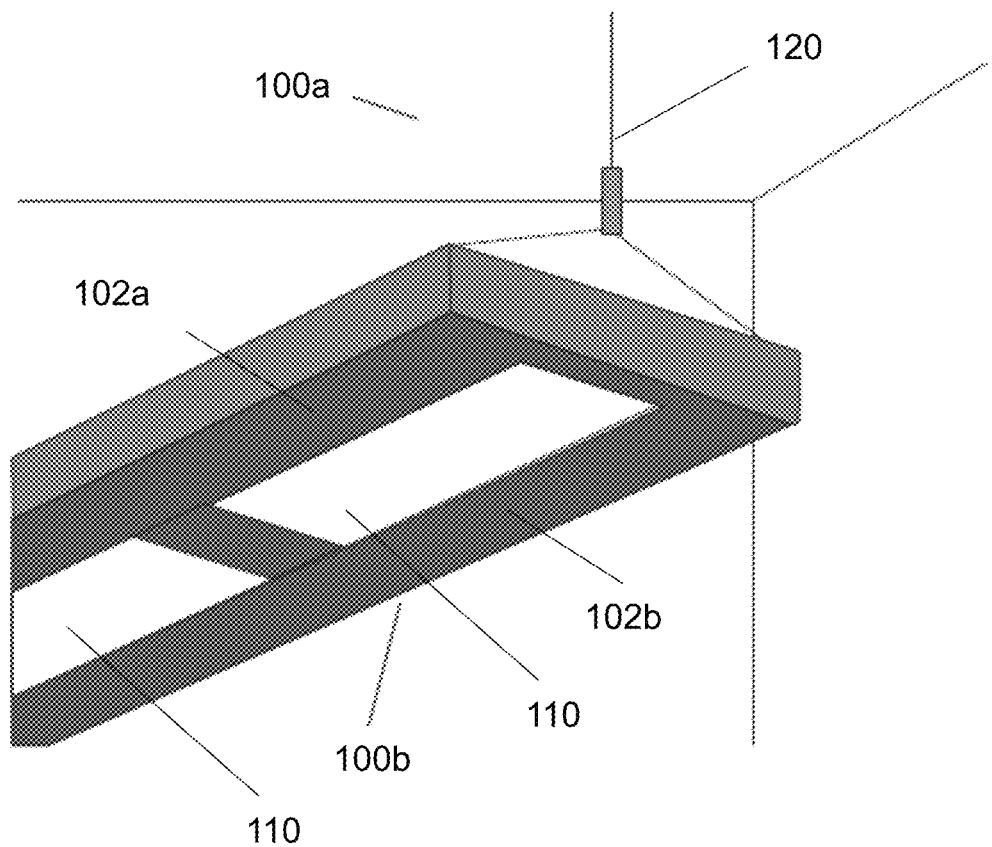
FIG. 1B is a perspective view of a light fixture embodiment suspended from a ceiling grid.

FIG. 1B shows an embodiment suspended direct/indirect light fixture embodiment 100b viewed from the downlight side. The light fixture embodiment is approximately 6 inches wide and is mounted to hang below the ceiling 100a supported by a cable or wire 120. The light fixture is configured to emit light out of both top (not shown) and bottom output faces 110 of the light fixture; in standard lighting industry terminology the downward light directed towards a wall or floor below being considered "downlighting" or "direct" and the upward light illuminating the ceiling considered "uplighting" or "indirect". The light fixture embodiment is linear with two identical sides 102a and 102b held in parallel alignment creating one or more configured output windows or output faces 110.

Figure 2A:
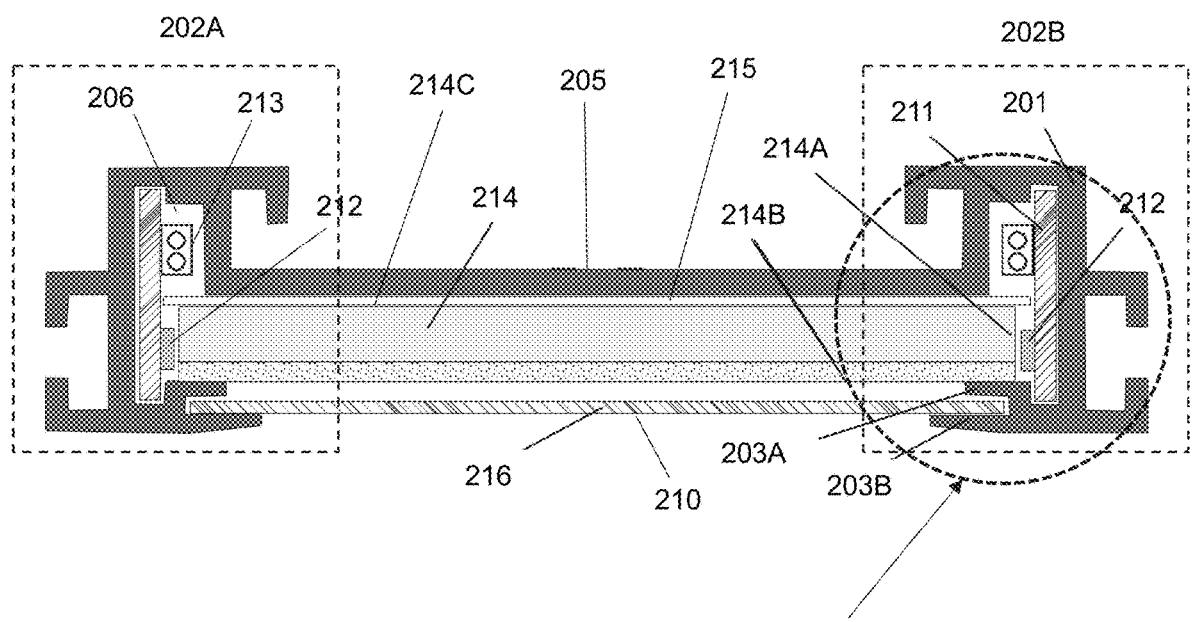
FIG. 2A and FIG. 2B (enlargement view) are cross section views of a light fixture with a double edge-lit planar optical element.
Figure 2B:
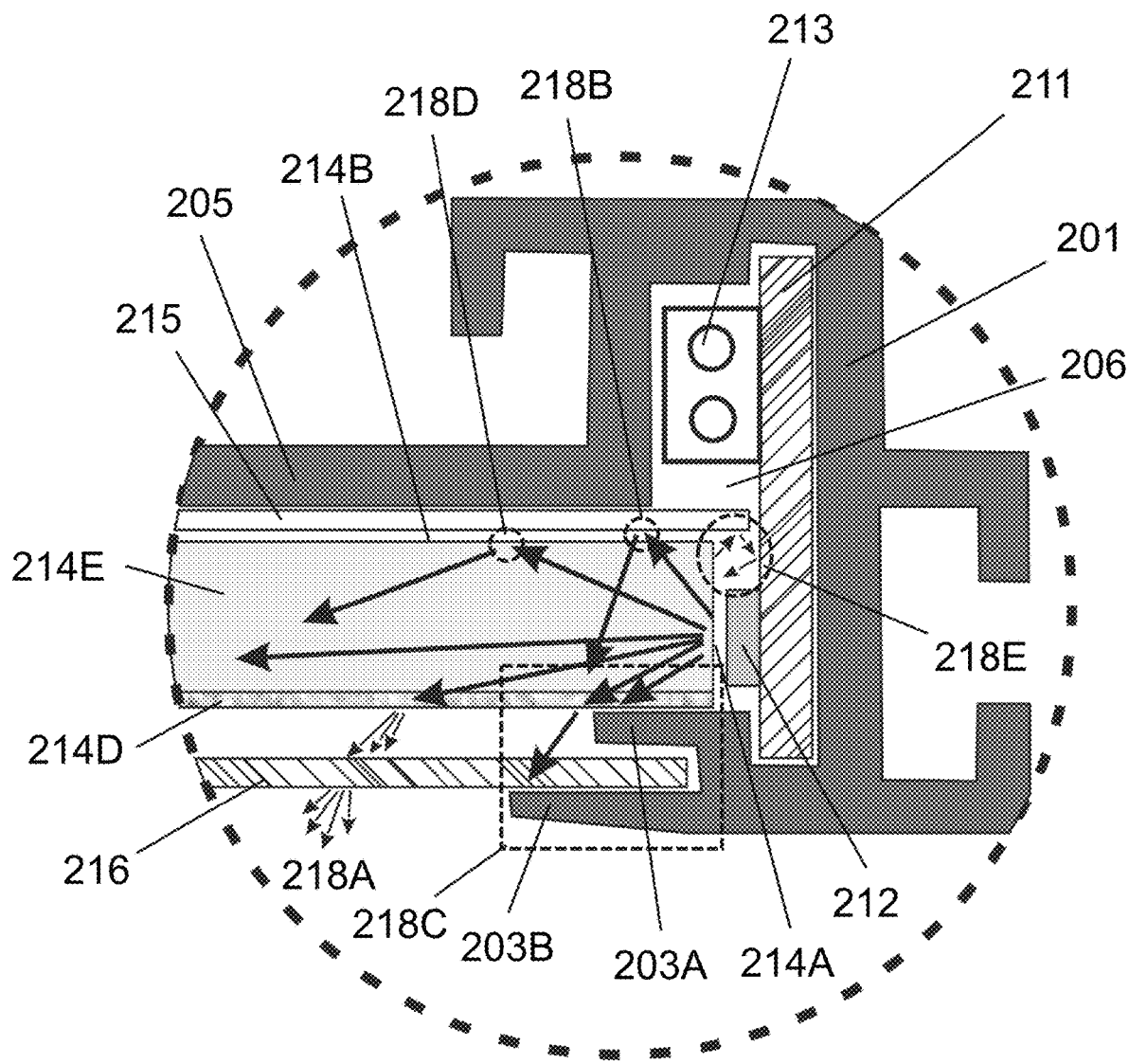
Figure 4B:
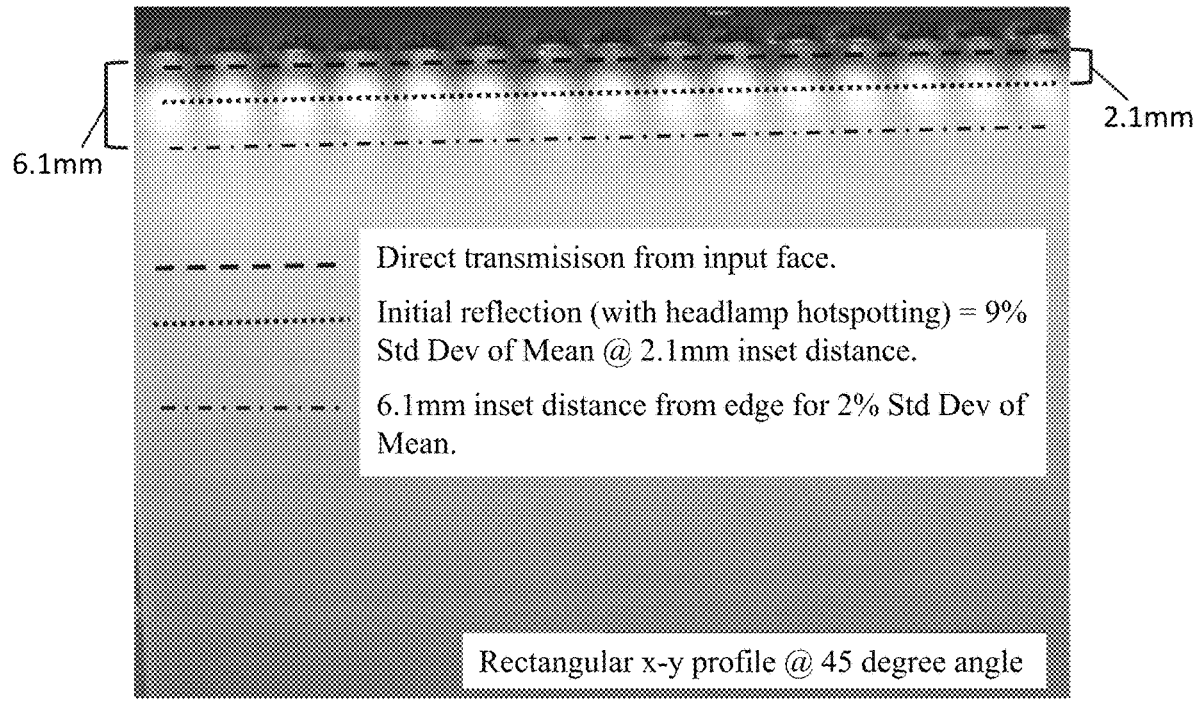
FIG. 4B is a digital image of a light fixture with planar edgelit optical element as shown in FIG. 2 but without a bezel or cover lens and having a 45 degree viewing angle of the optical element output face.

FIG. 2A and the enlargement view FIG. 2B show a cross-section view of a lighting fixture embodiment having a double edge-lit "diffuse layer" optical element 214. The elongate fixture body 201 is configured with two side or edge portions, highlighted as 202A and 202B, joined together by a backplane 205. Each side portion is configured so as to support at least one LED board and optical components as well as provide a wiring cavity 206 at least partially covered by a reflector 215 which extends past the edge of the optical element. The LED board is configured so as to position the electrical connector 213 within the wiring cavity 206. The optical element 214 is composed of a volume of optically transmissive material configured in a planar rectangular x-y cross sectional profile with an input face 214A on either side and a single and common adjacent output face 214B and a common adjacent inner face 214C that is positioned proximate to the reflector 208. The elongate fixture housing 201 holds in place the LED board, which comprises a printed circuit board 211 mounted upon which are one or more LED light sources 201 and electrical connector 213. The edge-lit optical element 214, reflector 215, and cover lens 216 which acts as the output surface 210 of the light fixture are retained and aligned within the elongate fixture body by internal support features. Light scattering within the optical element 214 is provided in this embodiment by a laminated PMMA1515 diffusion film on the output surface of the optical element. This provides a light scattering layer 214D positioned at the surface. In other embodiments, the light scattering layer could alternatively be a coating. In this embodiment the adjacent faces of the optical element are oriented at a 90 degree angle relative to the input faces. Also shown are inner bezels 203A and outer or front bezels 203B which cover a portion of the ends of the optical element in order to hold the optical element and cover lens in place and also to mask hot spot non-uniformities near the input face of the optical element 214. The front bezel 203B also defines the window or opening that is the front face or output face of the light fixture. In particular the optical element and reflector are retained in place the bezels holding each collectively against the elongate fixture body backplane 205. Furthermore the air gap between the optical element 214 and cover lens 216 can be used to help with appearance and uniformity of the output surface of the fixture. FIG. 2B is an enlargement of the end section of the light fixture embodiment of FIG. 2A and illustrates the propagation of light within the fixture by illustrating key light rays and optical interaction regions. Light emitted from LED 212 enters the input face 214A of the optical element 214 and a portion of light projects to the light scattering layer 214D where the light scattering causes some light to be to scatter and exceed the critical angle of refraction, thereby exiting the outer face 214B of the optical element and subsequently transmitting through the cover lens 216 which adds some additional light scattering and further changes the output light rays 218A. Another portion of light projected from the input face 214A exceeds the critical angle of internal reflection and exits the inner face 214C of the optical element and is subsequently reflected by the reflector back into the optical element as highlighted by optical interaction region 218B. Another portion of light from the input face 214A projects to the light scattering layer 214D of the optical element and exits the optical element but is blocked from directly exiting the cover lens by the inner bezel 203A or outer bezel 203B within the optical interaction region 218C. Generally an improvement in visual uniformity will be gained from the light blocking effect of the bezels. Head lamping is a particular visual non-uniformity which can be reduced by blocking the edge of the optical element from view. The appearance and image analysis of a specific head lamping effect is shown in FIG. 4B. Depending on particular configuration, the inner surfaces of the bezels can be more reflective or absorptive to either reflect light back into the optical element or absorb it. Another portion of light from the input face 214A of the optical element projects to the inner face 214B where it is internally reflected at optical interaction region 218D and further propagates further inward within the optical element. Optical interaction region 218E illustrates light exiting the input face 214A, for example from light propagating within the optical element from a second input face on the opposing side of the optical element, light scattered or reflected within the optical element, or light from the LED that reflects off the exterior of the input face. In optical interaction regions 218E, light exiting the input face of the optical element subsequently reflects off of the reflector 215 that extends past the edge of the optical element to prevent light from propagating to the non-optical wiring cavity 206. This improves optical efficiency when light in the optical interaction region 218E re-enters the optical element through the input face, such as by reflecting off of the PCB board 211 or the LED 212 package.

Figure 3A:
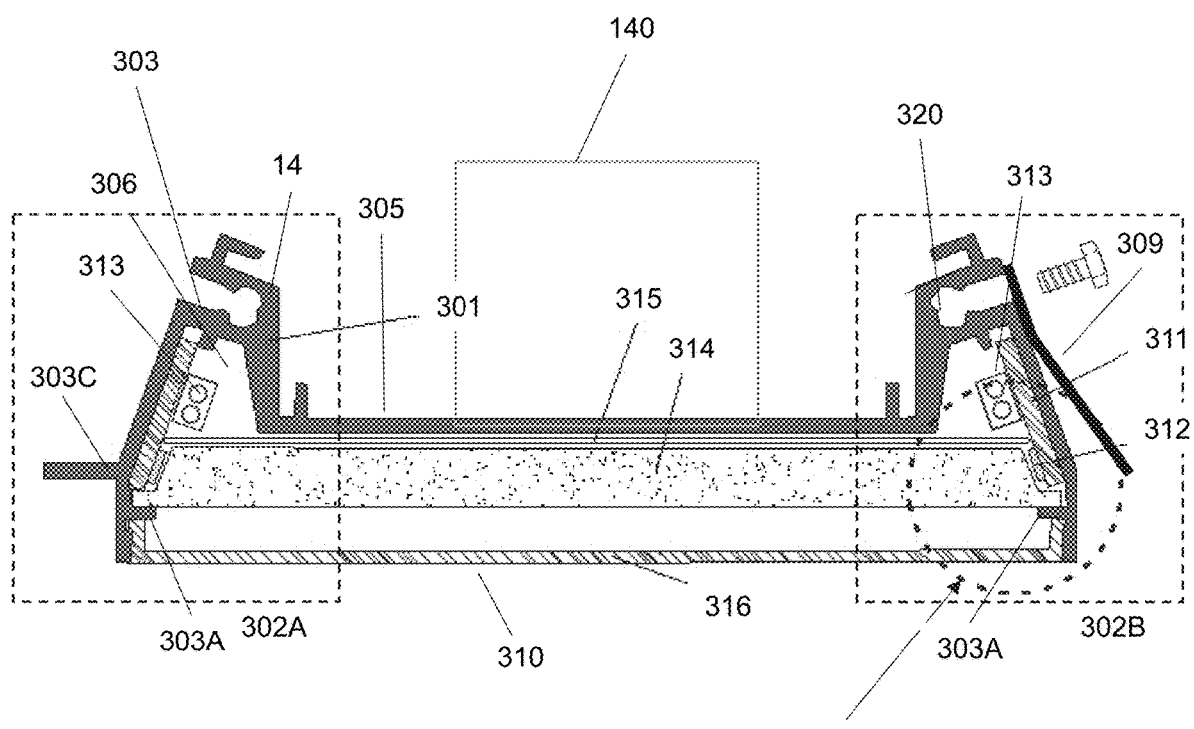
FIGS. 3A and 3B (enlargement view) are cross section views of a double edge-lit light fixture configured with an optical element having two angled input edges and an overhang feature at the input edges.

FIG. 3A show a cross-section view of an embodiment lighting assembly in which LED 312 light sources and electrical connectors 313 are mounted on an LED board 311 which provides a linear light source that inputs light into an optical element 314. A cover lens 316 is positioned over the outer face of the optical element and a reflector 315 behind the inner face of the optical element. The reflector, optical element and cover lens are retained in position and alignment by internal support features of the fixture body 301. In this embodiment the elongate fixture body additionally comprises a wiring cavity 306 behind the reflector 315. The LED board 311 is extended into the wiring cavity 306 of the side portion and the electrical connector 313 is positioned in the wiring cavity 306. In this embodiment a driver and enclosure 140 are mounted into the outer surface of the elongate fixture body backplane 305. Additionally a spring mounting clip 309 is fixed onto one side by a screw that connects into a screw boss feature 320 in the side portion of the elongate fixture body 302 and on the opposing side of the housing is a support ledge 303C. The mounting clip and support ledge function collectively to hold the fixture in the ceiling grid system. The mounting clips are configured from a spring material to enable the fixture to be flush with the sides of the fixture housing when the fixture is pushed up from underneath the ceiling grid system. Once the clips clear the upper surface of the horizontal portion of the T-bar they function as a means to retain the fixture in alignment within the ceiling grid system. Typically the width of the light fixture is chosen to be about ¾" less than the gap between the horizontal portions of the parallel T-bars to allow for the housing and the spring mounting clips to pass up through the gap. In the case of the 4" or 6" spacing of the parallel T-bars and a ⁹⁄₁₆" slot style T-bar the fixture would typically be 3⅜" or 5⅜" wide. The housing contains an inner bezel 303A feature which functions to cover the edge of the optical element including some or all of the optical element overhang 7. However, in this embodiment there is no front bezel, as is previously shown as 203B in FIG. 2A and FIG. 2B.

Figure 3B:
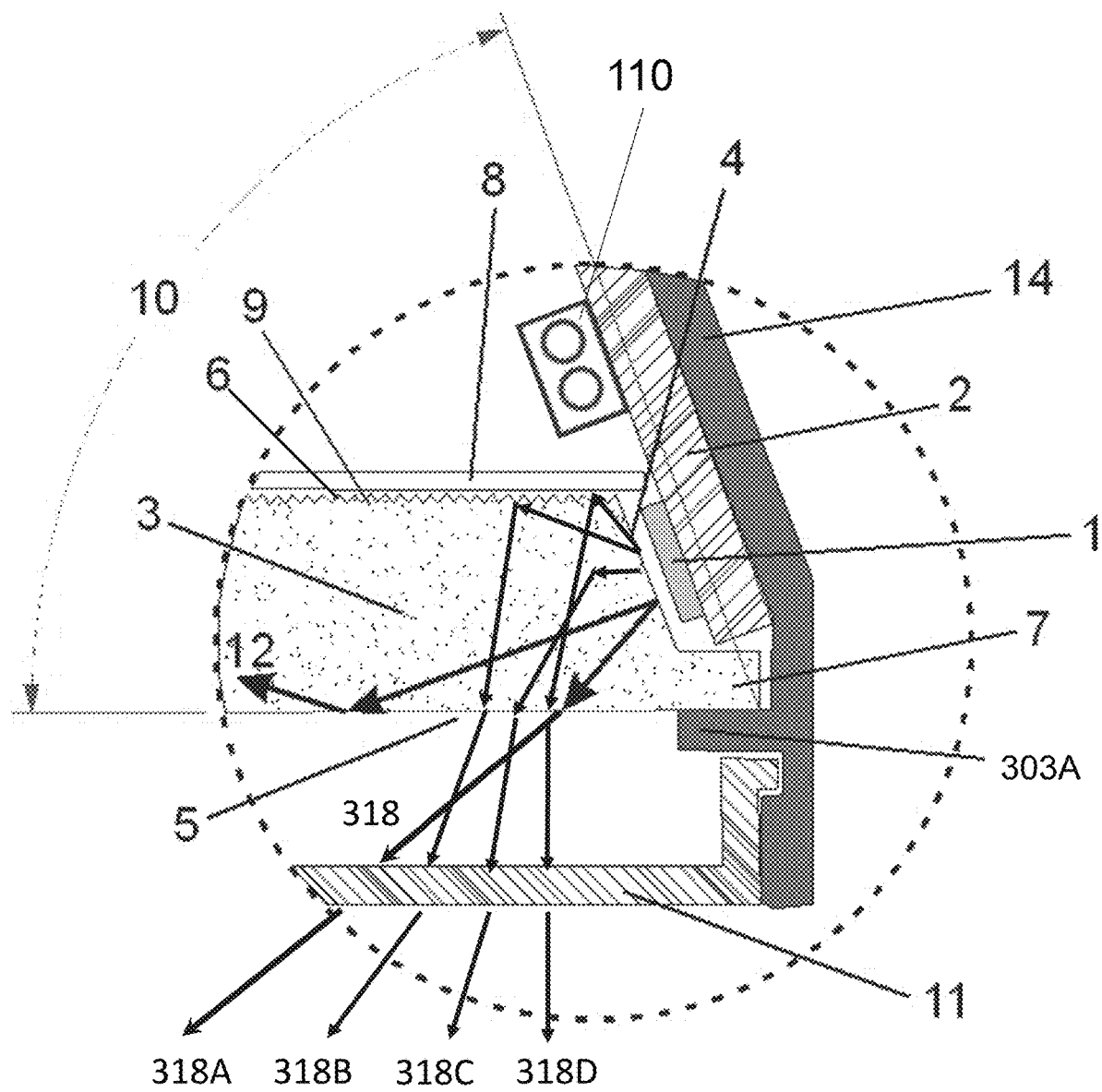

FIG. 3B provides an enlargement of the input region of the optical element shown in FIG. 3A. Light enters the optical element through an input face 4 and propagates and scatters within the optical element 3 and is emitted from the output face 5 and inner face 6 whereupon it is reflected back into the optical element by the reflector 8. More specifically, a portion of the light propagates directly through the optical element 3 on the direct transmission path 318 before exiting the output face and passing through the cover lens, this is shown as ray 318A. A portion of the light enters the optical element and refracts and reflects from the inner face 6 and back reflector 8 before exiting the optical element and cover lens, this are shown as rays 318B and 318C. A portion of the light enters the optical element and scatters after encountering dispersed light scattering particles before exiting the optical element and cover lens, this is shown as ray 318D. Concurrently a portion of the light propagates within the optical element on a TIR path 12 until it subsequently outcouples from the optical element 3. Means for outcoupling light are provided by lenticular surface features 9 on the optical element opposing face 6 as well as by the light scattering composition of the bulk optical element 3. In this embodiment of optical element the light scattering composition is provided by polymer beads dispersed within an acrylic matrix material having a differing refractive index. Light outcoupling out the opposing face 6 is redirected toward the optical element output face 5 by the reflector 8. The surface features may also be on the output face, or on both inner opposing faces and output faces. The shape and configuration of the surface features can also be used to control and shape the lighting distributions from the optical element. The elongate fixture body 14 encloses and holds in place optical components including the optical element 3, LED board 2, and if optionally present, the cover lens 11. The elongate fixture body contains an inner bezel 303A feature which functions to cover the edge of the optical element including some or all of the optical element overhang 7. However, in this embodiment there is no front bezel, as is previously shown as 203B in FIG. 2. The angled input face 4 and optical element overhang 7 work to improve brightness uniformity near the optical element edge and reduce the need for bezel coverage.

The optical element input face 4 is inset from the outer perimeter of the optical element output face 5 and is angled so as to form an acute input/output face alignment angle 10, the angle being 70 degrees in the specific case shown. The acute input/output alignment angle functions to reduce "headlamp" type hot spots from the reflector 8 near the input face 4 and also increases the ratio of direct transmission to TIR light propagating within the optical element. The optical element overhang 7 provides a feature for mechanically securing the optical element in the housing 14 without excessively trapping light behind the bezel 15 as typically occurs in a conventional edge-lit construction such as with the bezels 115A and 115B and input face 104 of FIG. 2. This functions to improve overall efficacy (lumens per watt) of the lighting system.

The cover lens 11 is an optional component which can be configured to enclose the output face of the light fixture and provide an appearance more uniform in brightness and color. Adjustments to the cover lens 11 surface geometry and bulk light scattering properties can be used to modify the output light distribution from that originating from the optical element output face 5. For example, adjustments to cover lens surface or volumetric light redirecting properties can be used to decrease the wide angle degree of lobes in the light distribution pattern or make brightness or color variations in the beam pattern emitting from the optical element output face more uniform. In the specific case of the FIG. 3A light fixture embodiment, the surface is congruent with the shape of the cover lens and the bulk of the cover lens material has light scattering properties measured to have a symmetrical full width half maximum value of 68 when measured as a separate component on measurement equipment using as an input light source a narrow beam laser normal to the input surface. The air gap and distance between the optical element output face and the cover lens can also be used to control the visual appearance. Typically increasing the air gap helps to reduce head lamping and edge brightness effects. However increasing the air gap too much will result in an unacceptable increase in overall height of the light fixture and may result in dark bands on either side of the cover lens. In the embodiment shown the air gap is approximately ¼" (5-6 mm) and typically the air gap is less than ½" (10-13 mm).

FIGS. 4i, 4ii, and 4iii show plan, isometric views of a nominal 1 ft long embodiment of the LED board used in various light fixture embodiments and used in the test setup of FIG. 4B-E. The LED board comprises a rigid linear printed circuit board (PCB) 411 with 60 packaged LED light sources 412 mounted on the PCB and connected via its electrical circuit. Commonly, LEDs are arranged in series circuits of 12 LEDs to produce a voltage of approximately 33 volts. Multiple 12 LED series circuits are then typically arranged in a parallel circuit. Spacing and pitch of LEDs has an effect on headlamping effects in optical elements. Typically, more than 36 LEDs/ft are used to minimize headlamping. The PCB board can be cut to length at increments between each string of LEDs in series. The LED board of FIG. 4 has two electrical connector 413A and 413B which in this embodiment can either be used for electrical connection to the entire LED board. In alternative embodiments multiple electrical connectors can be used to independently address separate LED channels. The electrical connectors are offset relative to the LED light sources. This is important when connecting rows of LED boards in series within the light fixture body. If the connectors were in line with the LED light sources then there would be a visible shadow and also mechanical interference with the gap spacing between LEDs and optical element input face. It is important that the front surface of the LED board is highly reflective and white. Typically this is achieved using a white solder mask 8 or a white reflective stencil that is placed over the LED board.

Typically LED electrical channels are driven by a constant current LED driver which generally provides less variation in power during operation compared to other options such as constant voltage power supplies. The voltage of individual LEDs typically change significantly vs. temperature making precise control difficult with voltage control devices over a range of thermal environments and applied power levels.

Figure 4C:
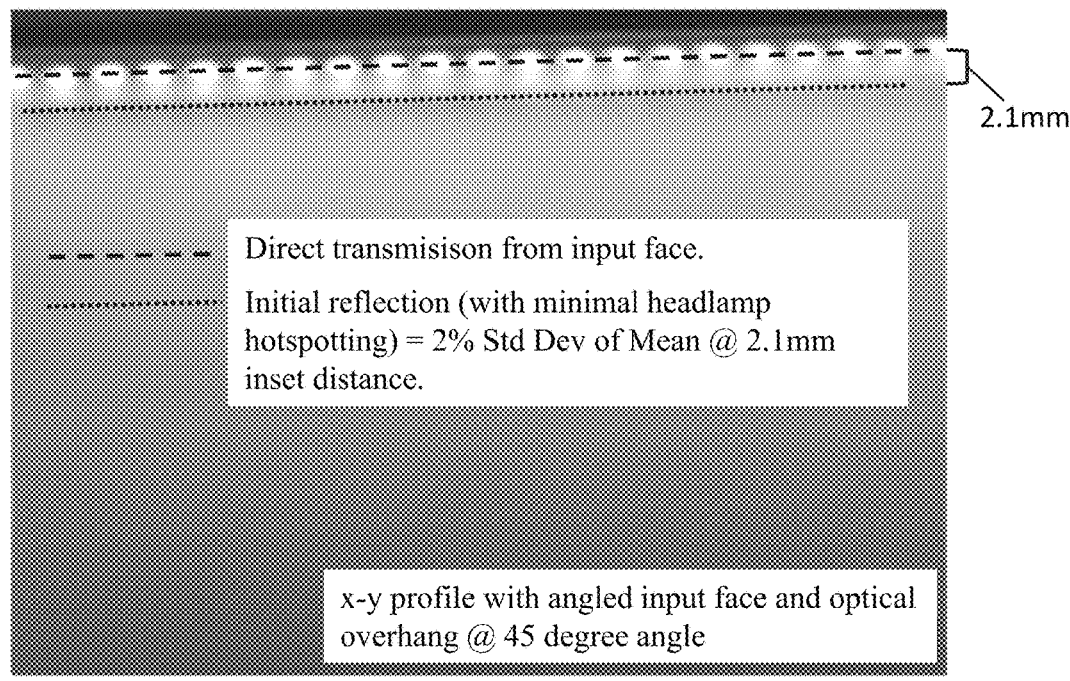
FIG. 4C is a digital image a light fixture as shown in FIG. 3A but without a bezel or cover lens and having a 45 degree viewing angle of the optical element output face.

FIG. 4B and FIG. 4C are a digital images showing optical subassembly comparison of embodiment light fixture type as shown in FIG. 2A and FIG. 3A respectively but without an inner or outer bezel or cover len. It is therefore a fundamental visual and light output representation of edgelit optical element output face comparing a rectangular cross-sectional profile embodiment (FIG. 4B) vs. an embodiment with an angle input edge and optical overhang (FIG. 4C). In both cases the LED board of FIG. 4A is used with a LED spacing (center to center) of 4.68 mm. Both images were taken at a 45 degree viewing angle of the output face. Marked on the images are locations where line scans were analyzed to assess brightness levels corresponding to light directly transmitted through the optical element and light that exits the inner face of the optical element and reflects from the reflector back into the optical inner face. In the case of the FIG. 2A rectangular profile embodiment, the initial reflection produces significant hot spot patterning commonly referred to as "headlamping" due to similarity in appearance of automotive headlamps projecting onto ground in front of a car. The headlamping effect is minimal in the FIG. 4C image of the light fixture embodiment of FIG. 3A with angled input face and optical overhang. For a given LED spacing, the reduction in headlamping by the design of the optical element thereby reduces the need for the front bezel, as is shown in FIG. 3A.

Figure 5A:
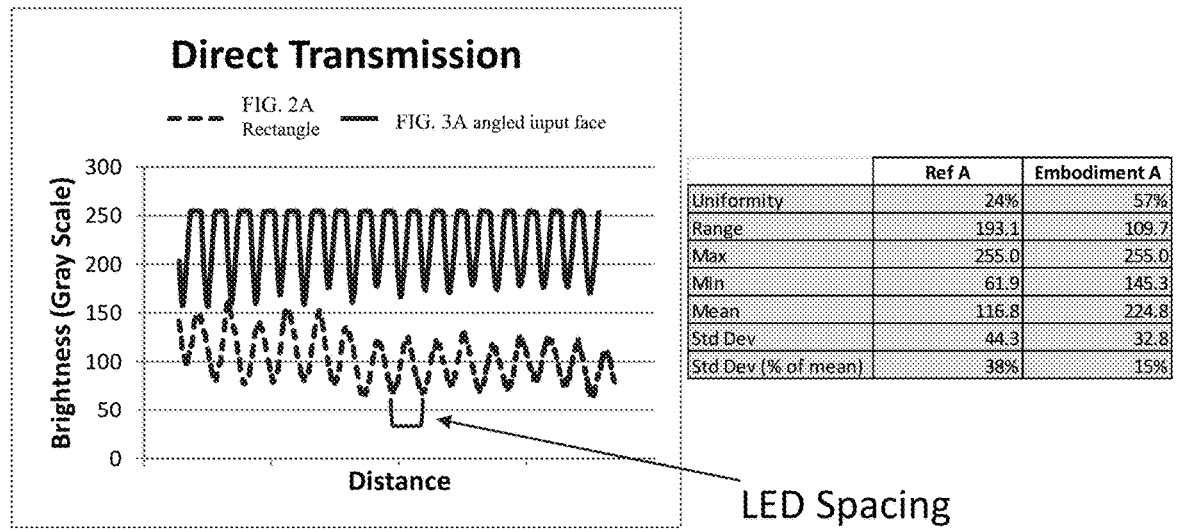
FIG. 5A is a graph and table comparing quantitative metrics from digital images of FIG. 4B & FIG. 4C relating to line scan paths for direct light transmission out the optical element output face.
Figure 5B:
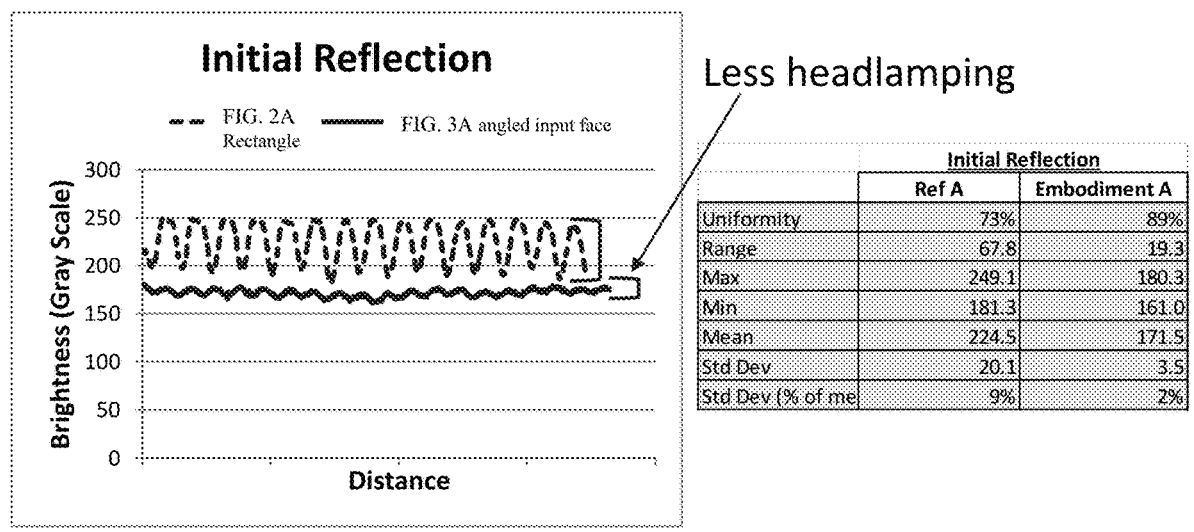
FIG. 5B is a graph and table comparing quantitative metrics from digital images of FIG. 4B & FIG. 4C relating to line scan paths through initial reflection headlamping regions.

FIG. 5A and FIG. 5B each show graphs and quantitative metrics characterizing brightness values along the line scan paths for the same light fixture embodiments of FIG. 4B and FIG. 4C; FIG. 5A for the and FIG. 5B for initial reflection. For the light fixture embodiment of FIG. 3A, the direct transmission is significantly greater than that of FIG. 2 embodiment. In addition to the data of FIG. 5A, this is evidenced by illumination measurements at 45 degrees comparing full optical optical element output vs. that with the output face masked except for the narrow band of direct transmission zone near the input edge. In this case, the embodiment of FIG. 3A direct transmission was 28% of full output at 45 degree angle while the FIG. 2 embodiment direct transmission was 12% of total output at 45 degree angle.

Figure 6A:
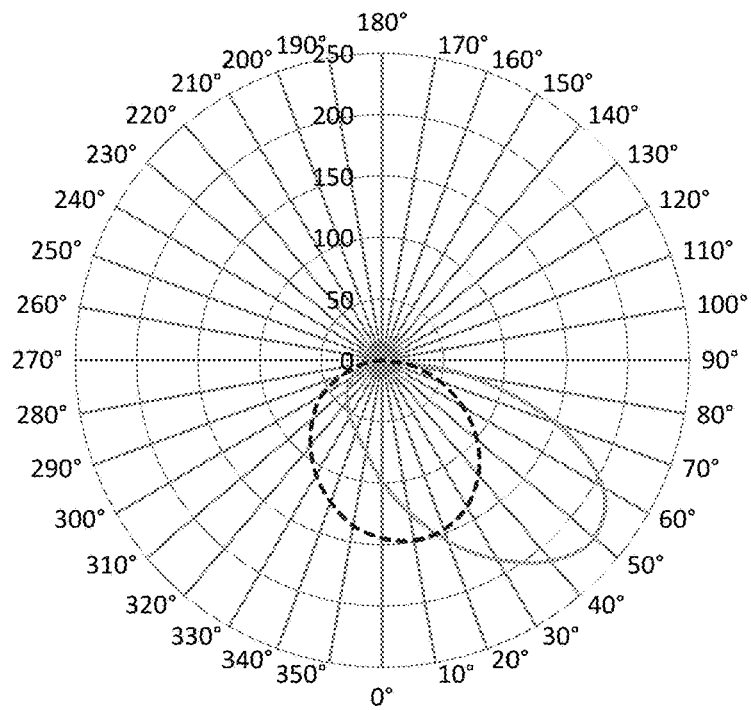
FIG. 6A is a polar plot of the embodiment light fixture of FIG. 3A with one side only LED strip on and the light fixture oriented down as a direct lit downlighting fixture.

FIG. 6A is a polar plot of embodiment light fixture shown in FIG. 3A with one side only LED strip on, referred to as a "single edge-lit" design, and the light fixture oriented downward as a direct lit downlighting fixture. The plot highlights how the light distribution from the optical element outer face is modified by the cover lens. The cover lens shown is a diffusion lens characterized by a goniometric radiometer as having a symmetric full width half maximum (FWHM) of 68×68 degrees and an optical haze value of 100 and clarity of 2. This provides a large amount of light scattering that decreases the off axis orientation of light emitted from the optical element output face and produces a light distribution that is more rounded and closer to lambertian. The amount of asymmetry in light distribution output can be controlled by selection of amount of light scattering in the cover lens to obtain a range of options between the "no cover lens" and "with cover lens" options illustrated in FIG. 6B.

Figure 6B:
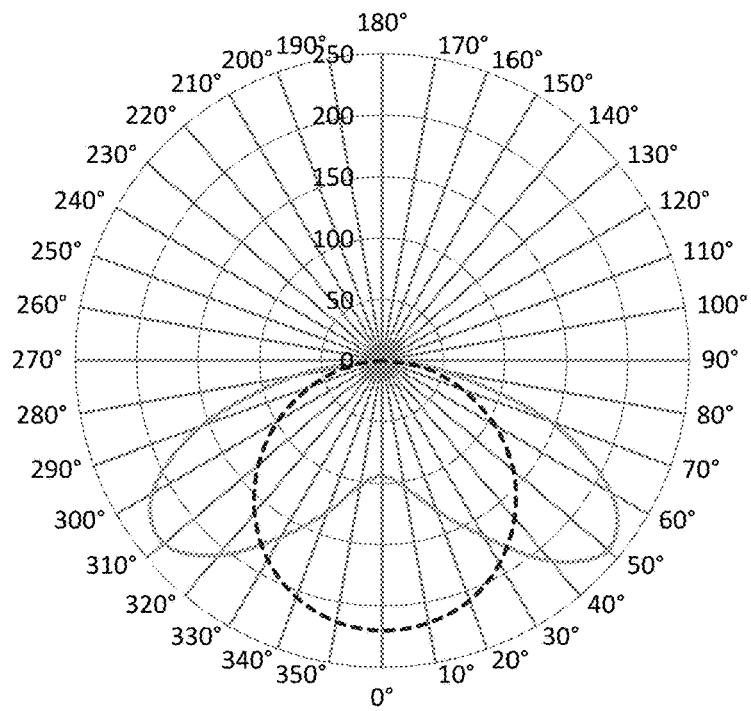
FIG. 6B is a polar plot of the embodiment light fixture of FIG. 3A with LED strips on both sides on and the light fixture oriented down as a direct lit downlighting fixture.

FIG. 6B is polar plot of light fixture shown in FIG. 3A with LED strips on both sides of an optical element, referred to as a "double edge-lit" design, and the light fixture is oriented down as a direct lit downlighting fixture and shows a batwing type light distribution which can be adjusted to provide less asymmetry by increasing light scattering in the cover lens. The cover lens in this embodiment also has a symmetric FHWM of 68×68 degrees and an optical haze value of 100 and clarity of 2 which results in a very symmetric light distribution.

Figure 7A:
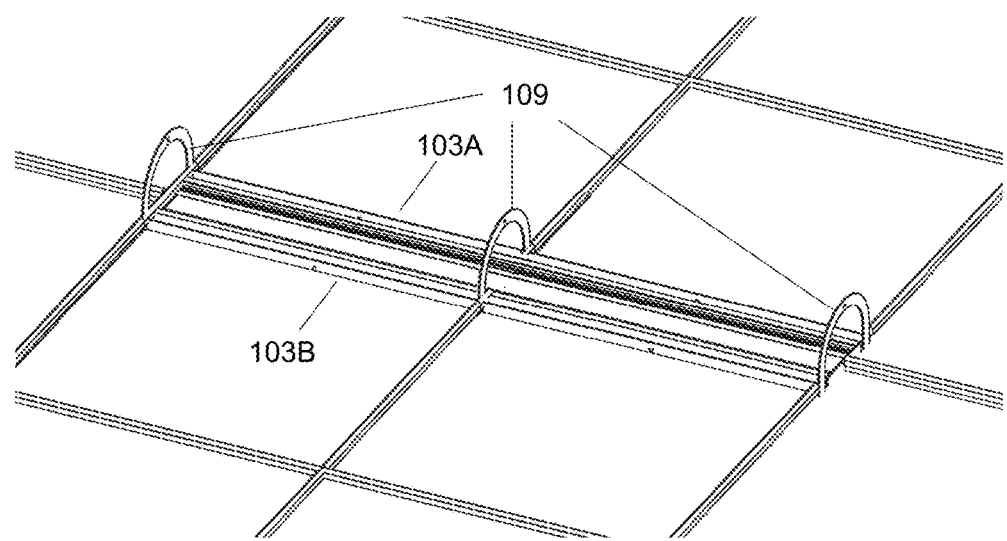
FIG. 7A is an illustration of a T-bar frame configured to house the light fixture in the ceiling grid

FIG. 7A is an overhead perspective view of the light fixture embodiment of FIG. 1A installed in a ceiling grid. In this embodiment the T-bars are organized so as to create a frame that matches the external dimensions of the light fixture and in particular two T-bars 103A and 103B are positioned parallel to one another and at a configured separation. T-Bar separation brackets 109 are used to ensure the spacing between the parallel T-bars is maintained and accurate. Typically the spacing of the parallel T-bars is 4" or 6" as measured center-on-center between the T-bar vertical portions.

Figure 7B:
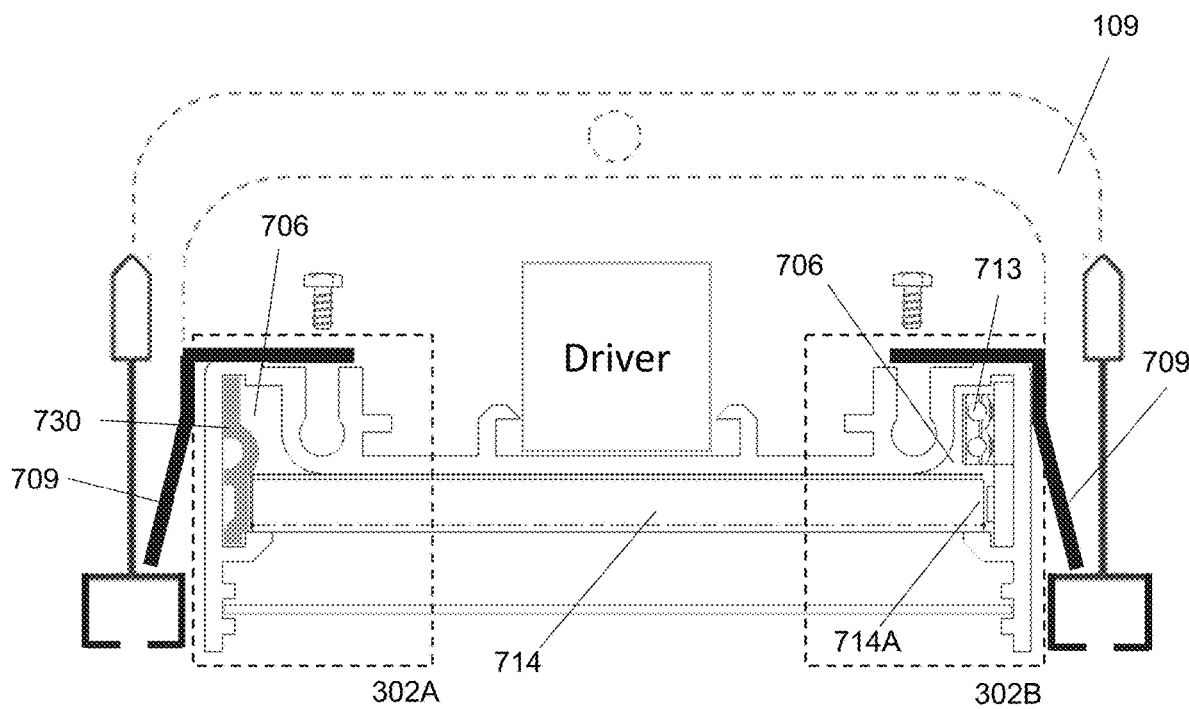
FIG. 7B is a cross section of a light fixture embodiment with retaining hardware to support it in the T-bar frame.
Figure 7C:
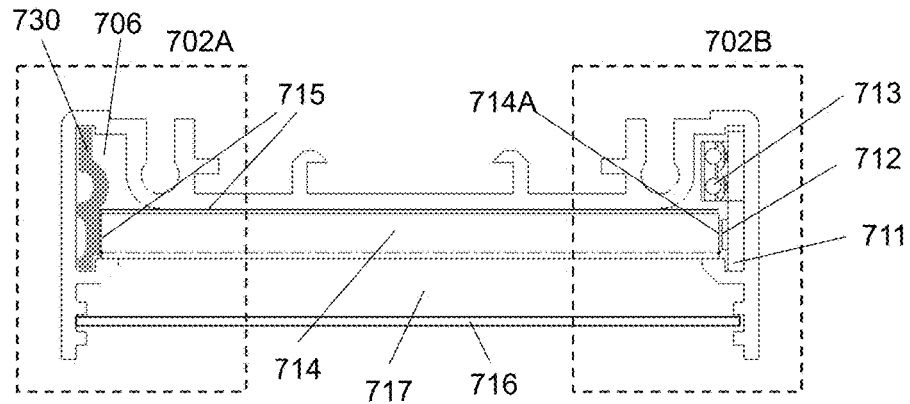
FIG. 7C illustrates a cross section view of a single edge lit light fixture embodiment and polar plots of lighting distributions from a single edge-lit light fixture embodiments with different types of cover lens.
Figure 7C:
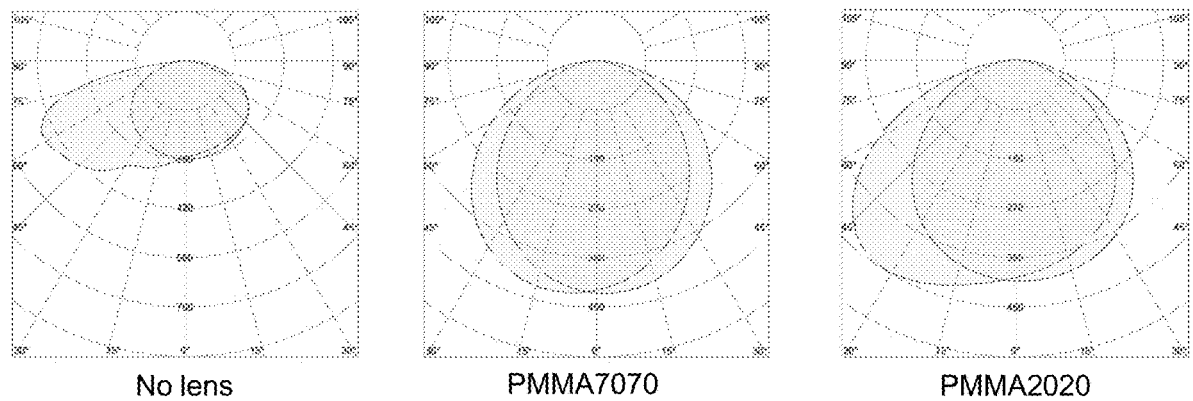
Figure 7C:
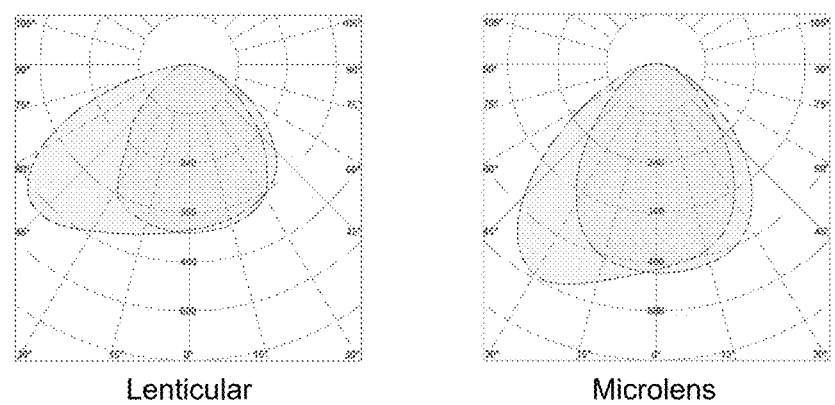

FIG. 7B & FIG. 7C show cross section views of single edge lit constructions with a single input edge 714A of optical element 714. Reflector 715 is positioned on both the inner face and opposing face of the optical element 714. A positioning component 730 is configured to fit into the elongate fixture body and act as a support feature which aids in holding and retaining the optical element and reflector in position. The positioning component could specifically be a spacer, spring clip, or gasket. A material with some amount of flex or elastic compression is beneficial in setting and retaining the optical element and reflector in proper position. The positioning component can further be configured to enable the optical element and reflector to be removable once the fixture is installed in its intended location for use. The positioning component 730 is positioned within a non-optical cavity 706 which can be used for housing electrical wiring. FIG. 7B shows hardware to support the embodiment fixture in a T-bar frame mounted on both sides by spring mounting clips 709 attached to both side portions 702A and 702B by screws that locate into screw boss features in the side portions. The mounting clips are configured from a spring material to enable the fixture to be flush with the sides of the fixture housing when the fixture is pushed up from underneath the ceiling grid system. Once the clips clear the upper surface of the horizontal portion of the T-bar they function as a means to retain the fixture in alignment within the ceiling grid system. Typically the width of the light fixture is chosen to be about ¾" less than the gap between the horizontal portions of the parallel T-bars to allow for the housing and the spring mounting clips to pass up through the gap. In the case of the 4" or 6" spacing of the parallel T-bars and a 9/16" slot style T-bar the fixture would typically be 3⅜" or 5⅜" wide.

FIG. 7C illustrates polar plots of lighting distributions from a single edge-lit light fixture embodiments with no cover as well as different types of cover lens. The light distribution with no cover lens is asymmetric with a peak intensity that is obliquely angled relative to the normal from the output face of the optical element. A PMMA7070 diffusion lens with haze of 100 and clarity of 2 converts this distribution to one that is much rounder and closer to lambertian. Alternatively the PMMA2020 diffuser which has much lower diffusion levels and higher clarity preserves the asymmetrical aspect of the light distribution although it shifts the angle of peak intensity closer to the normal and also widens the overall spread of light. Similar effects are shown with a lenticular cover lens and a microlens cover lens.

Figure 8A:
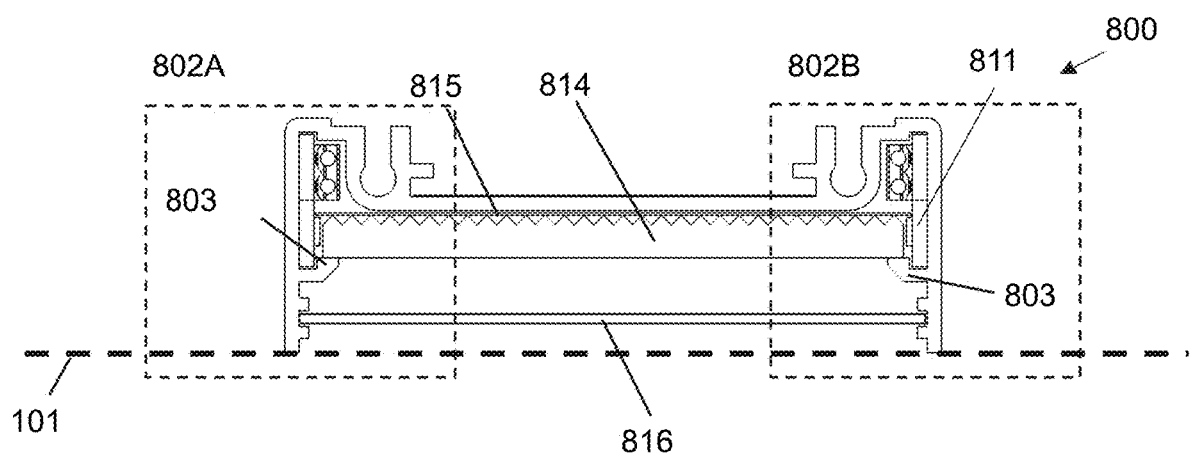
FIG. 8A illustrates a cross section view and various polar plots for a double edge-lit light fixture embodiment with a horizontally retained optical element.
Figure 8A:
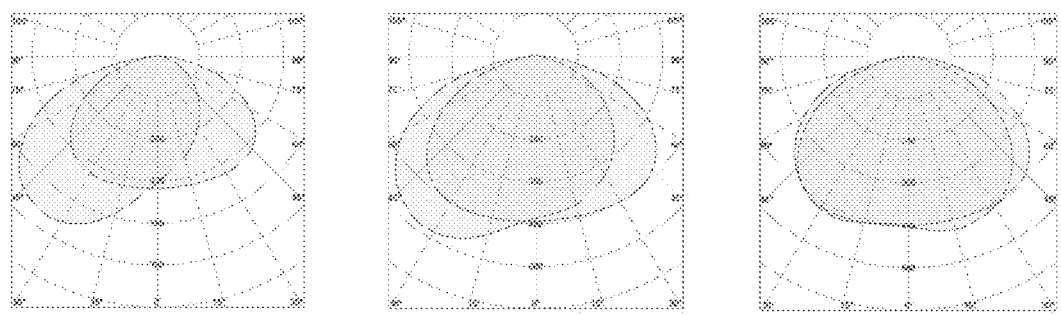
Figure 8A:
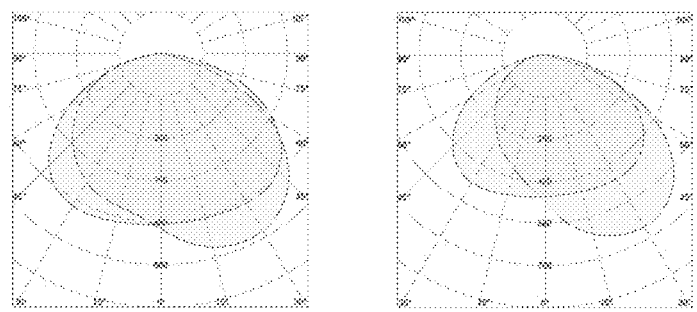

FIG. 8A illustrates various polar plots for a double edge-lit light fixture embodiment with a horizontally retained recessed optical element 814 installed above the ceiling grid plane 101 and held in place by bezels 803. In this embodiment the cover lens 816 is a relatively high clarity PMMA2020 diffuser. This cover lens was chosen because the higher clarity preserves more of the asymmetry and directionality of the light output from the optical element. The polar plots cover five different ratios of electrical power applied to the LED boards on each side of the optical element. When 100% of power is applied to the LED board on side B the light distribution is a narrow beam with approximately 40 degrees of tilt away from the vertical on its opposing side. This changes to become a much wider beam tilted by approximately 40 degrees in the opposite direction when 100% of the power is applied to side A. Additionally it is shown that the beam is somewhat symmetrical and centered on the vertical when 50% of power is applied to side B and 50% is applied to side A.

Figure 8B:
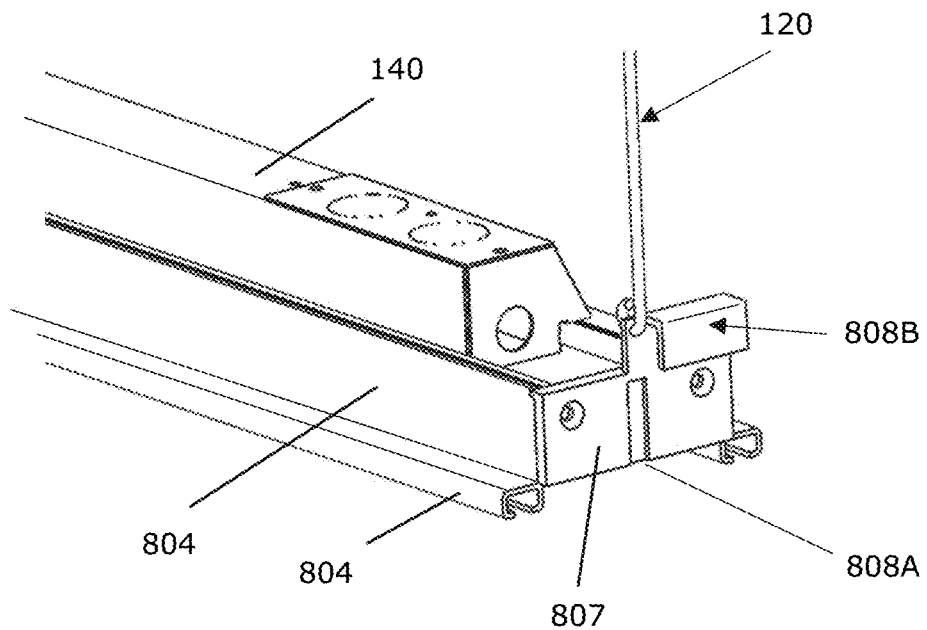
FIG. 8B illustrates a linear light fixture embodiment for use in a slot style T-bar ceiling grid system.

FIG. 8B illustrates a linear light fixture embodiment for use in a slot style T-bar ceiling grid system. The elongate fixture body 801 further comprises a T-Bar feature 804 on the fixture body side portion which is configured to support a ceiling panel within a suspended ceiling grid system. The end plate 807 encloses the longitudinal end of the light fixture and further comprises end plate feature 808A which is a recessed groove for clearance of a T-bar anchor prong protruding through a T-bar joint. Additional end plate feature 808B is a latch for mounting over a T-Bar vertical portion and is offset from the longitudinal centerline of the fixture so that an additional fixture can be mounted inline on the other side of a T-bar connection without the mounting latches from the two fixtures interfering with each other. Connecting to the end plate 807 is a suspension cable 120 for attachment to an overhead structural ceiling. Mounted on the top of the elongate fixture body 801 is a LED driver 140.

Figure 8C:
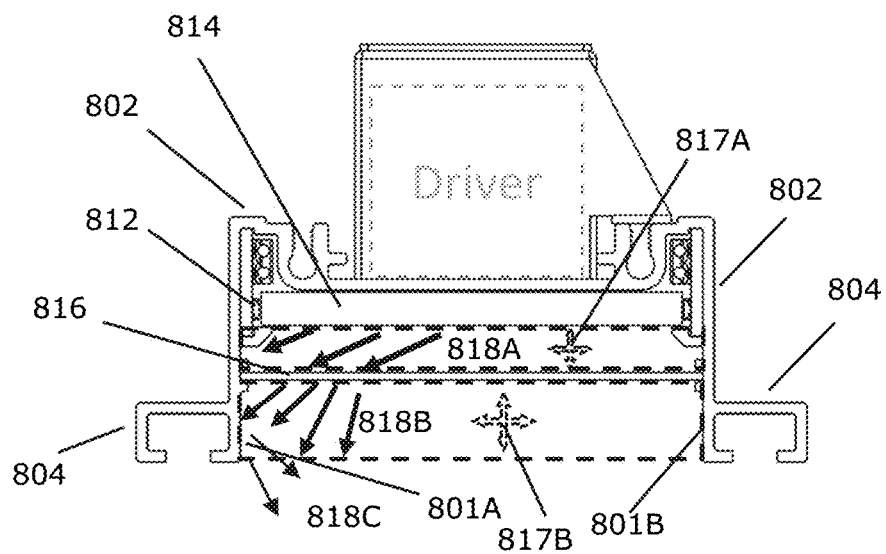
FIG. 8C illustrates a cross sectional view of double edge lit light fixture embodiment highlighting function of cover lens in directing optical rays.
Figure 8D:
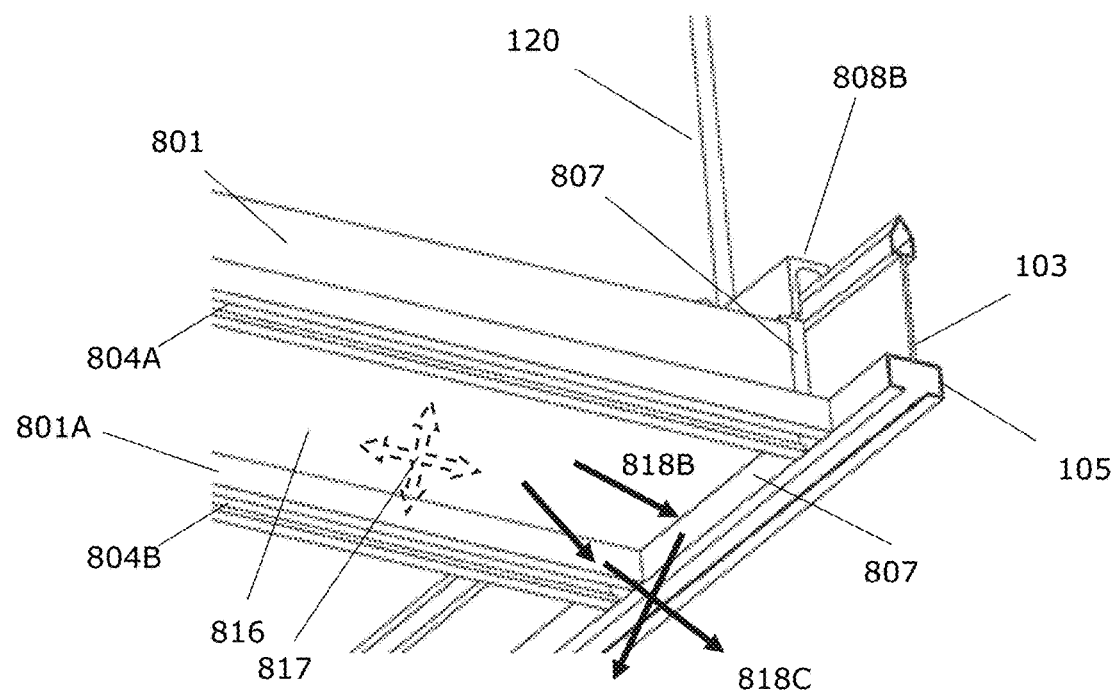
FIG. 8D illustrates the light fixture embodiment of FIG. 8C mounted in ceiling grid system highlighting optical rays reflecting off inner surface of fixture body and end plates.

FIG. 8C illustrates a cross sectional view of double edge lit light fixture embodiment highlighting function of cover lens in directing optical rays and FIG. 8D shows a bottom perspective view of the same light fixture embodiment mounted in a ceiling grid system. Optical rays are highlighted to characterize the path of light after it is output from the optical element 814. Optical rays 818A proceed to the cover lens 816 where they are partially scattered and redirected into rays 818B, a portion of which are further reflected from interior side wall 801A of the elongate fixture body and transformed to rays 818C. As shown in FIG. 8D, there are also light rays that reflect from the interior face of the end plate 807. The configured light fixture embodiment of FIG. 8C and FIG. 8D has both an inner optical cavity 817A which is bounded by the outer face of the optical element 814, the inner face of the cover lens 816, the elongate fixture body interior side walls 801A and 801B, and end plates 807. The outer optical cavity 817B is a volume bounded by the outer face of the cover lens 816, elongate housing fixture interior side walls 801A and 801B, and the end plates 807 of the fixture. Both optical cavities have an effect on light distribution output from the light fixture.

FIG. 8D also illustrates the light fixture embodiment of FIG. 8C mounted in a ceiling grid system by connection with a T-bar. The end plate latch feature 808B mounts over the T-bar 103 which has a T-bar horizontal portion 105 which matching the appearance of the T-bar features 804A and 804B integrated into the side portions of the elongate fixture body 801.

Figure 8E:
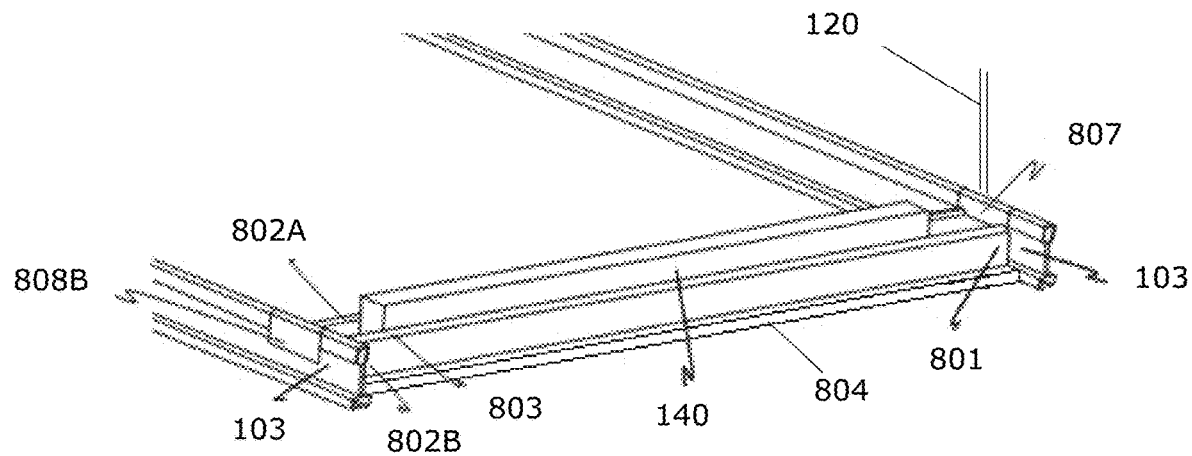
FIG. 8E illustrates mounting of light fixture embodiment in ceiling grid supported at each end of its elongate body.

FIG. 8E is an overhead perspective view illustrating mounting of the light fixture embodiment of FIG. 8C in ceiling grid supported at each end of its elongate body.

Figure 9:
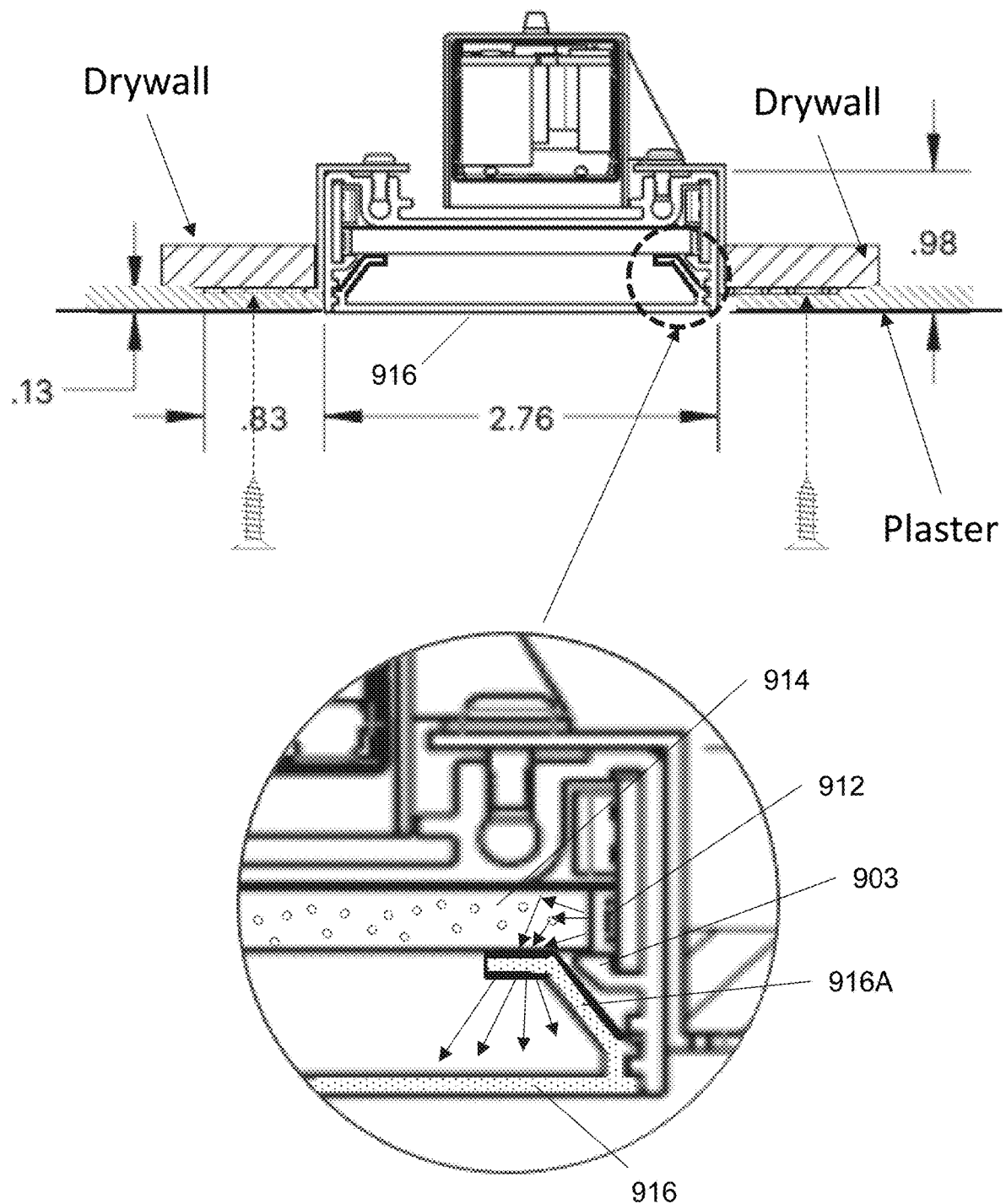
FIG. 9 is end view of lighting fixture embodiment configured for mounting into drywall and containing an optical element with a prong feature for improved brightness uniformity and luminous efficacy.

FIG. 9 is an end view illustration of a light fixture embodiment configured for recessed mounting into a drywall based ceiling or wall grid. In such an application the drywall panels may be supported by T-bars and the light fixture is held in place by screws that fix the mounting brackets to the front of the drywall. The finished assembly is then plastered over often referred to as "mudded in" or the fixture as being configured for "mud in". The dimensions in the illustration are in inches. In this embodiment the need for a front bezel has been eliminated by the use of a novel snap-in cover lens 916. The cover lens has legs 916A that extend to partially cover the input edge of the optical element. The legs 916A are comprised of an optically transmissive light scattering blend that diffuses brighter light from the edge of the optical element 914 and provides a more uniform appearance. The uniformity improvement can be used in shifting a number of optimization tradeoffs in a fixture related to optical efficiency and luminous efficacy. For example, improved uniformity can allow for use of a much smaller bezel 903. Alternatively, an optical element with increased light extraction but greater brightness near input edges can be utilized to enable a narrower but still highly optically efficient cross sectional width.

Figure 10A:
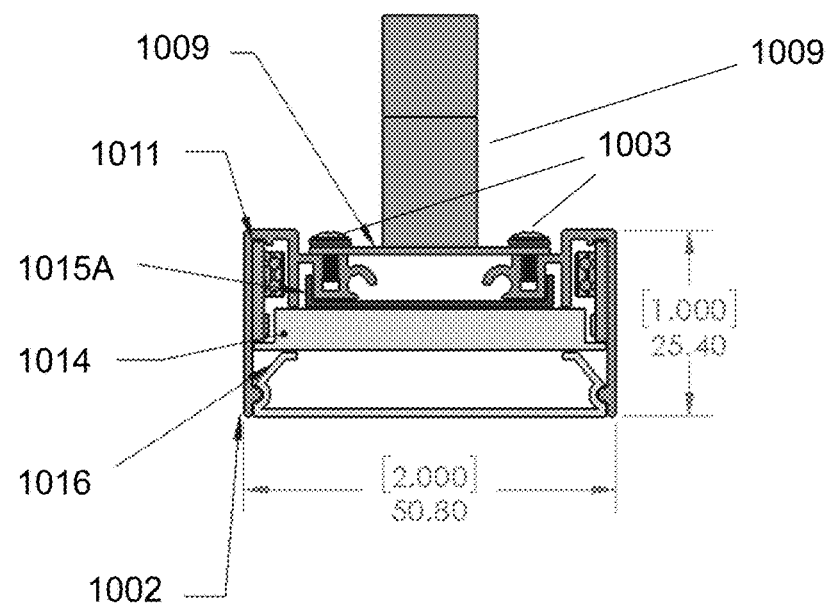
FIG. 10A provides end views of three different width (2", 3.25" and 5.25") light fixture embodiments for mounting into suspended ceiling with wood panels.
Figure 10A:
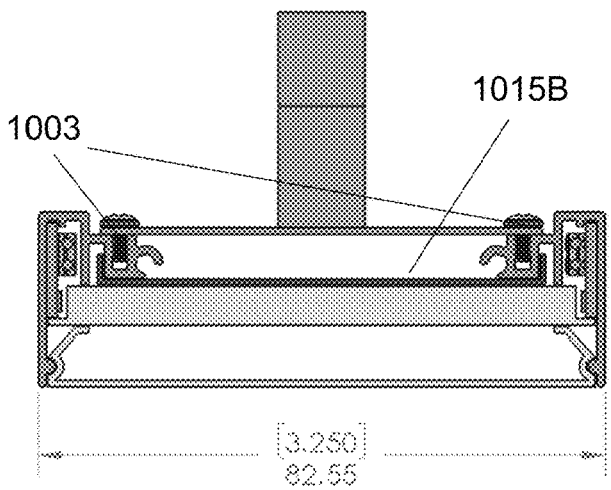
Figure 10A:
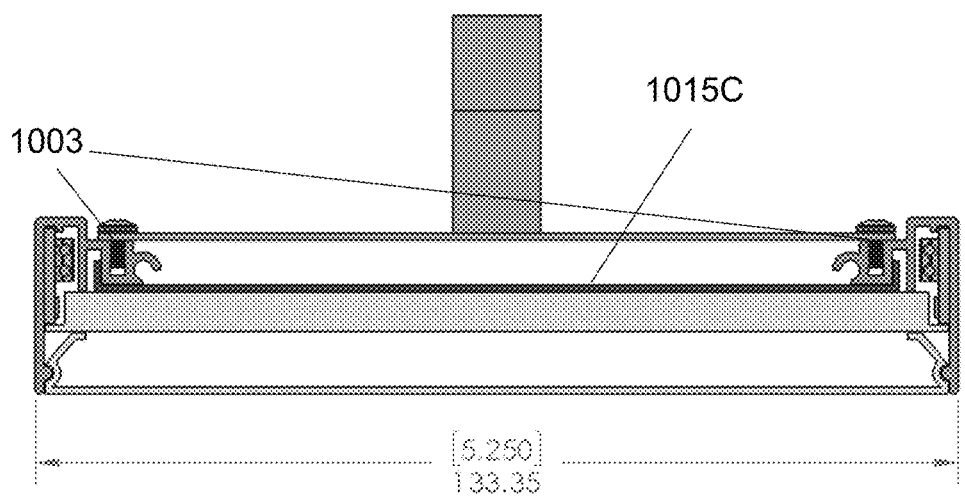

FIG. 10A provides end views of three different width (2", 3.25" and 5.25") light fixture embodiments with a reflector serving as a connecting backplane. Each embodiment is designed to be mounted into a ceiling grid system incorporating wood panels mounted onto T-bars. In the first case the side portions 1002 of the fixture body are identical. The side portion housing additionally comprises a vertical groove feature and the back reflector 1015A is bent along its edge so that the bent edge locates into this vertical groove feature. The same configuration is applied to the opposing side portion. When the fixture is assembled the bent edge of the reflector 1015A holds the two side portions in parallel longitudinal alignment. In such a manner the width of the fixture backplane can be easily changed by changing the width of the reflector as illustrated subsequently by the wider light fixture configurations with reflectors 1015B and 1015C. End plates on each longitudinal end of the fixture further aid alignment and provide rigidity. Additionally a screw boss feature 1003 is incorporated into the side portion cross section for the purpose of both attaching the end plate and attaching more brackets as needed along the longitudinal length of the light fixture to further hold the side portions in accurate parallel alignment. An integrated connection clip 1009 is used as a mounting bracket for overhead connection. When configuring light fixtures for different widths it is typically useful to increase the amount of light scattering in the optical element as the width decreases in order to boost efficacy and improved brightness uniformity of narrower optical elements makes that feasible.

Figure 10B:
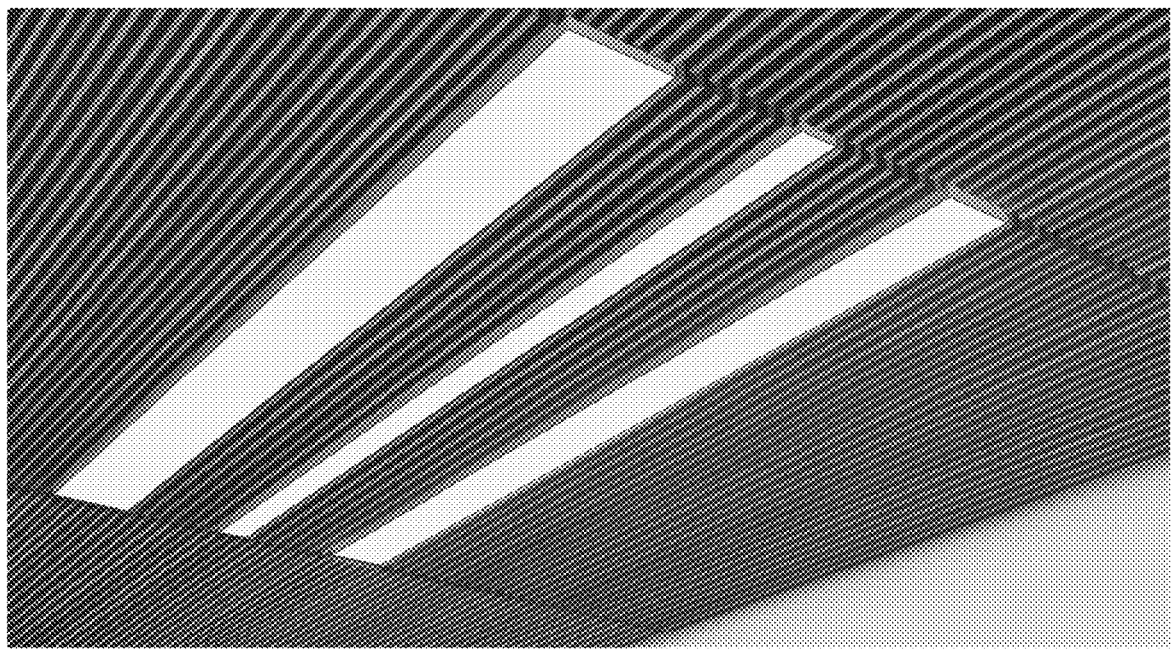
FIG. 10B shows a bottom perspective view of 3 different width light fixture embodiments mounted into a suspended ceiling with wood panels.

FIG. 10B is an isometric rendering of the three light fixture embodiments of FIG. 10A mounted into a ceiling grid system with wood panels.

Figure 10C:
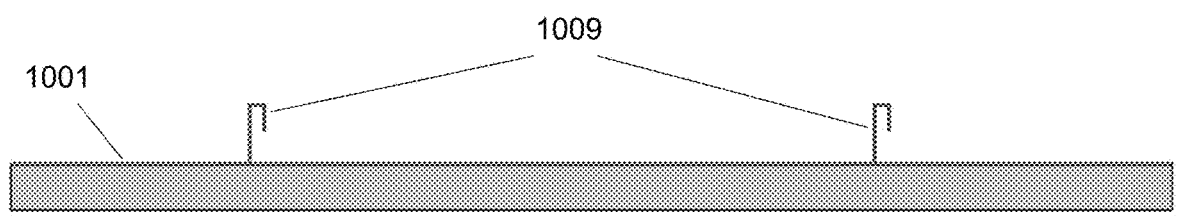
FIG. 10C is a side view of a linear fixture embodiment showing position of mounting clips.

FIG. 10C is a side view of a light fixture embodiment body 1001 with mounting brackets 1009 positioned at points on its longitudinal length for the purpose of supporting the light fixture in a ceiling grid system with wood panels as shown in FIG. 10B.

Figure 11A:
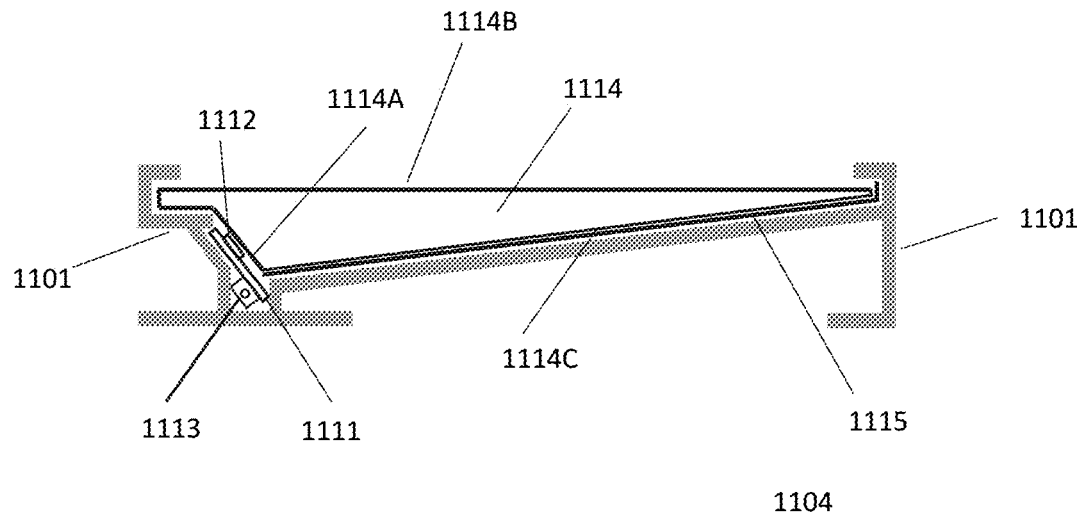
FIG. 11A is an x-y cross section view of a light fixture embodiment with a wedge shaped optical element having an angled input face that is configured for cove lighting applications.

FIG. 11A is a cross-section view of a wall cover fixture embodiment. An optical element 1114 receives light from an LED 1112 mounted on an LED board 1111 at an optical element input face 1114A. The LED board 1111 is mounted within the elongate fixture body 1101 and has on the opposite side from the LED an electrical connector 1113. The backside placement of the electrical connector allows the frontside with LED to maintain a flat plane for mounting flush to the housing. Light entering the optical element 1114 at the input face 1114A propagates through the optical element by a combination of direct transmission and TIR paths before outcoupling out the optical element output face 1114B. Light that exits the optical element from the optical element inner face 1114C reflects off the reflector 1115 and propagates back through optical element to exit out the output face 1114B. The wedge shape of the optical element 1114 improves efficacy and uniformity by gradually decreasing the cross-sectional area across the width available for TIR.

Figure 11B:
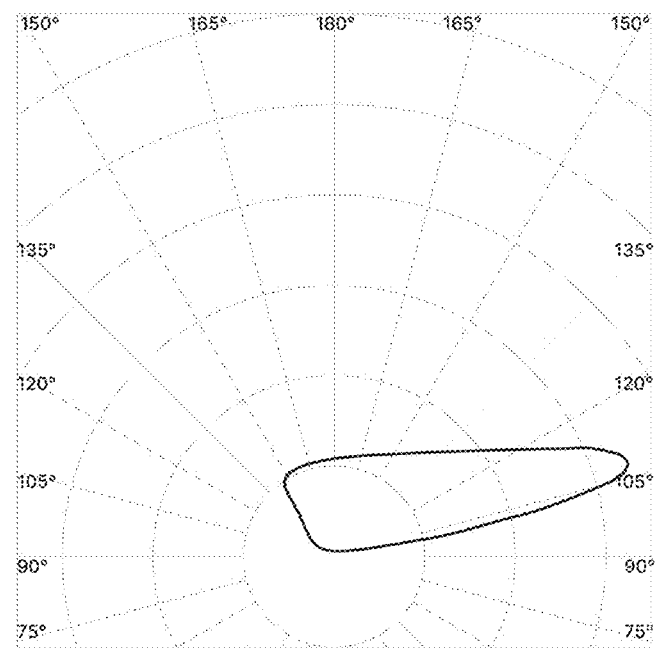
FIG. 11B is a polar plot of the light fixture embodiment of FIG. 11A.

FIG. 11B is a sketch of a photometric plot representing the light distribution from the cove light fixture embodiment of FIG. 11A. The asymmetric light distribution is well suited for a cove lighting application wherein the light fixture is typically mounted horizontally near a wall/ceiling interface.

Figure 11C:
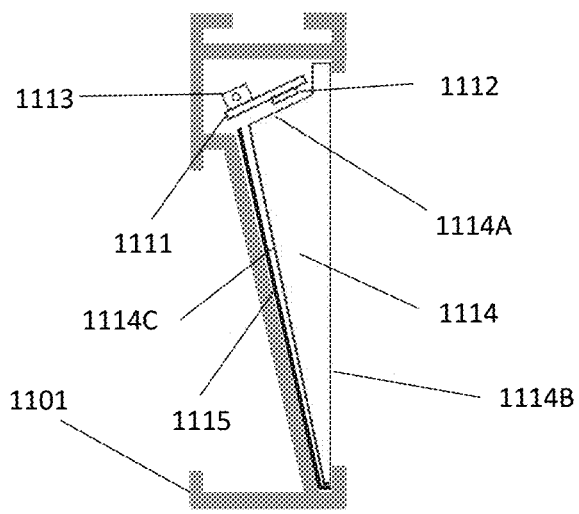
FIG. 11C is an x-y cross section view of a light fixture embodiment with a wedge shaped optical element having an angled input face that is configured for wall washing applications.

FIG. 11C is a cross-section view of a wall wash fixture embodiment. An optical element 1114 receives light from an LED 1112 mounted on an LED board 1111 at an optical element input face 1114A. The LED board 1112 is mounted within the elongate fixture body 1101 and has on the opposite side of the LED board from the LED an electrical connector 1113. The backside placement of the electrical connector allows the frontside with LED to maintain a flat plane for mounting flush to the housing. Light entering the optical element 1114 at the input face 1114A propagates through the optical element by a combination of direct transmission and TIR paths before outcoupling out the optical element output face 1114B. Light that exits the optical element from the optical element inner face 1114C reflects off the reflector 1115 and propagates back through optical element to exit out the output face 1114B. The wedge shape of the optical element 1114 improves efficacy and uniformity by gradually decreasing across width the cross-sectional area available for TIR.

Figure 11D:
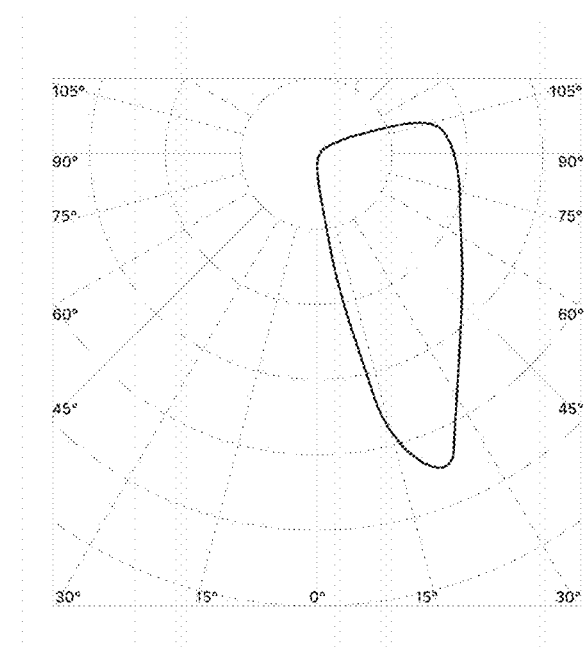
FIG. 11D is a polar plot of the light fixture embodiment of FIG. 11C.

FIG. 11D is a sketch of a photometric plot representing the light distribution from the wall wash light fixture embodiment of FIG. 11C. The asymmetric light distribution is well suited for a wall wash application wherein the light fixture is typically mounted vertically with the optical element output face substantially parallel to a wall surface.

Figure 11E:
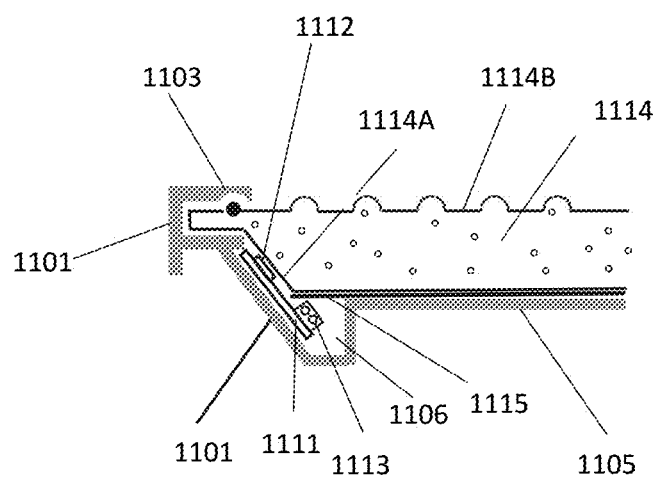
FIG. 11E is a partial cross section view of a light fixture embodiment is a cross-section view in which a gasket is fitted between the housing bezel and optical element overhang to provide a seal with ingress protection.

FIG. 11E is a cross-section view of a light fixture embodiment with reflector 1115 in which a gasket 1132 is fitted between the bezel 1103 and optical element 1114 overhang to provide a seal with ingress protection. The location of the gasket 1132 set back from the LED board 1111 with LED 1112 minimizes blockage of light output from the output face 1114B and can be an advantage in both efficacy and visual appearance.

Figure 12A:
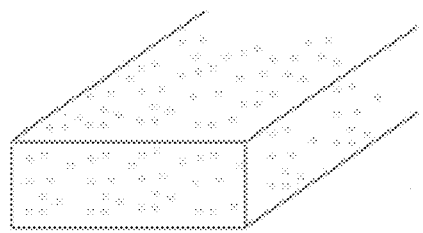
FIG. 12A shows isometric illustrations of various embodiments of edge-lit optical elements used in light fixture embodiments.
Figure 12A:
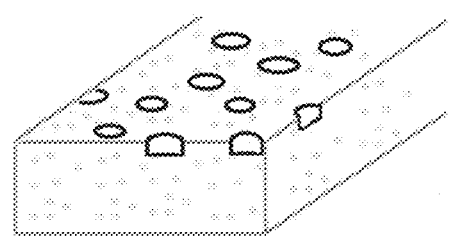
Figure 12A:
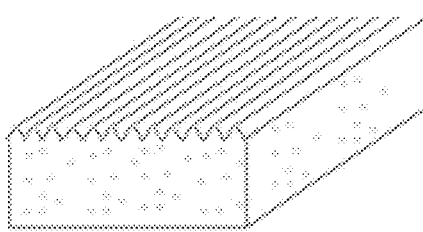
Figure 12A:
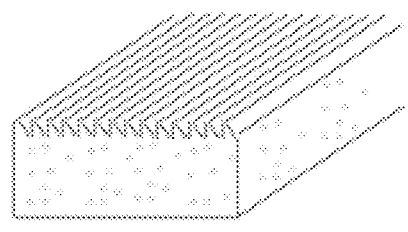
Figure 12A:
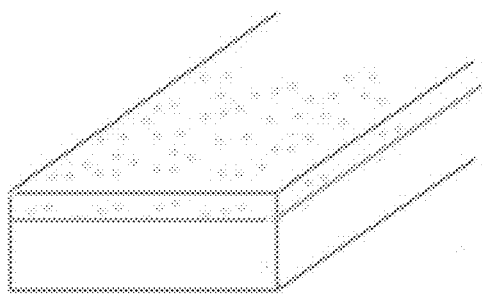
Figure 12A:
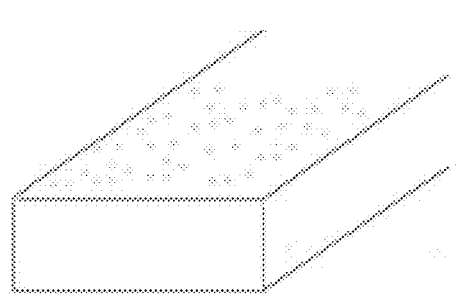
Figure 12A:
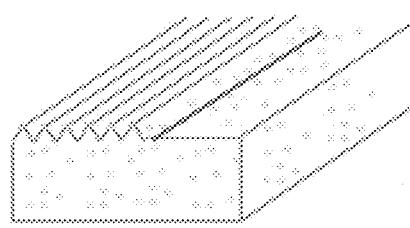

FIG. 12A shows isometric illustrations of various embodiments of edge-lit optical elements used in light fixture embodiments illustrating key elements. Important to various embodiments are dimensions of thickness, width and height. Volumetric light diffusion is produced by dispersed regions, layers or coatings within the optical element or on its surface having refractive index different than the bulk matrix material. Concentration of diffusing blend is an important variable in effecting light scattering properties that influence angular light distribution and uniformity of beam pattern. Embodiments described include optical element light scattering formulations comprising clear PMMA resin blended with cross linked PMMA beads having slightly differing refractive index. Cross linked PMMA beads are commercially available in compounded format as resin pellets with specific concentration that can be blended with clear resin pellets in standard extrusion feeder equipment. Alternative means in creating dispersed regions of differing refractive index than the optical element matrix material include dosing microbeads into the optical element resin formulation as well as forming second phase regions in situ by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other than spherical, for example oblate paraboloid, thereby generating non-symmetric light scattering. Processes for fabricating optical elements include coating, lamination, extrusion and injection molding. Surface features and their pattern of arrangement on a face of the optical element are of importance in converting internal reflection within the optical element to output from the module at desired angular light distribution.

FIG. 12B is table containing optical properties of various embodiments of edge-lit optical elements. Light fixture embodiments were configured using various edge-lit optical elements with common optical properties. In all cases where diffuse internal scattering or a diffuse layer or coating was one of the primary mechanisms the optical clarity was measured as being less than 25, and significantly less than clear etched optical elements or edge-lit signage grade acrylic. It was also noticeable that the optical elements with diffuse light scattering of some form also all had a haze of greater than 80. Furthermore the gloss of the optical element surfaces were typically significantly less than 100 and in most cases there was a significant disparity in gloss levels for the output and inner faces of the optical element, further illustrating the requirement that the configuration of the optical element output and inner faces with the reflector and cover lens is an important design consideration.

Figure 13B:
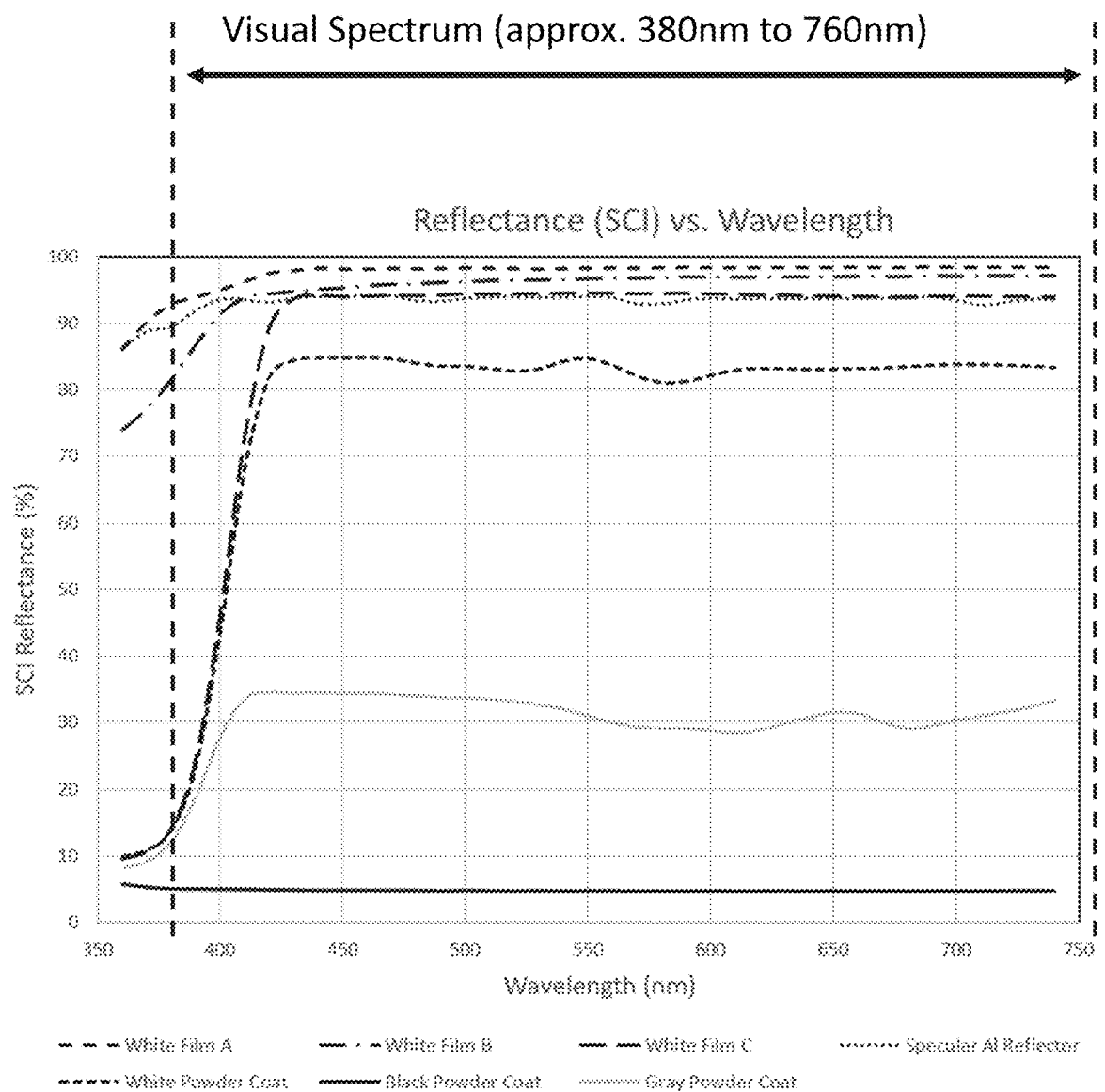
FIG. 13B is a chart of visual reflectance spectrum for various reflectors used in light fixture embodiments.

FIG. 13A (data table) and FIG. 13B (spectral plot) show properties of specular reflectors and white reflector film (WRF) used in the lighting module and light fixture embodiments compared to black, grey and white powder coated samples. reflectance of some example light reflecting surfaces available for lighting module configurations. Powder coatings are commonly used to coat light fixtures and lighting modules but in general not highly reflective. White is the most reflective powder coat color but is significantly less reflective than the white reflector films and specular aluminum reflectors that can be configured in lighting modules. For example, the reflector 215 of light fixture embodiment shown in FIG. 2A can be configured with high reflectance white polymer films or specular metal surfaces for improved efficacy and energy efficiency. Additionally, different lighting module light distribution effects and visual appearance of brightness variation can be controlled by the selection of diffuse and/or specular reflectors. In the data table of FIG. 13B, SCI reflectance measurements represent "Specular Component Included" while SCE reflectance measurements represent "Specular Component Excluded" SCI measurement include the total reflected light while SCE measurements subtract the specular component and only measure diffuse reflectance. As can be seen by comparing the color properties of chromaticity [(x, y) and (u', v')] and yellowness index [YI(E313-96] there is significant color variation not only between different materials but between SCI and SCE measurements of a same material. When a material has significant difference in SCI and SCE color reflectance properties it has been found to contribute to lighting module and subsequently light fixture color vs. angle variation. Furthermore, it has been found that selection and configuration of reflective surfaces within embodiment lighting modules can be utilized to beneficially control and limit the amount of color variation in lighting modules.

FIG. 13B is a table showing the properties of specular reflectors and white reflector film (WRF) used in the lighting module and light fixture embodiments compared to black, grey and white powder coated samples. The specular reflectors used exhibit significantly higher levels of reflectance when compared to the paint samples. Significantly; the paint samples also impair a "color bias" based upon a substantial change in the yellowness index. If an embodiment white reflector film (WRF) and specular reflector of the embodiments are not used then the resulting lighting distributions will have a significant change in color when compared to the original color from the LED being used. Also, merely using powder coated paint will result in a substantial drop in overall optical efficiency and reduction in lumens per watt (L/W) from the lighting module or light fixture. It is possible to incorporate surface properties of the specular reflector or WRF in the lighting module housing by specialized coating formulations or lamination for instance. It is also possible to achieve similar results by laminating or coating reflective surfaces to the inner face and opposing face of the edge-lit diffuser. FIG. 13A is a chart showing reflectance with specular component included (SCI) versus wavelength. This chart further highlights the importance of choosing an optimal reflector with a high level of reflectance across the entire visible range (380 nm-750 nm).

Figure 14A:
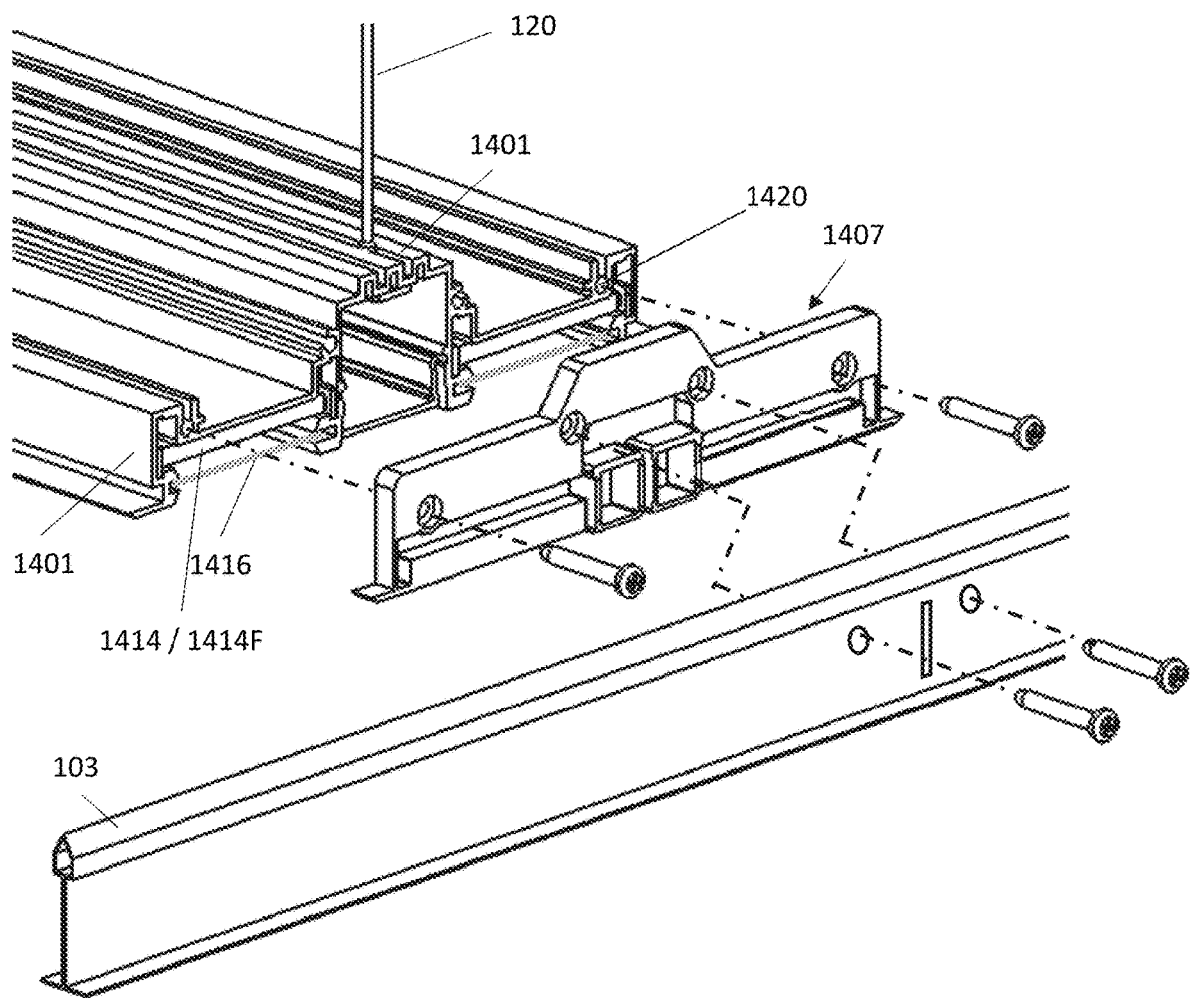
FIG. 14A shows an exploded perspective view of an embodiment endplate in relation to an embodiment light fixture and ceiling grid T-bar.

FIG. 14A shows an exploded perspective view of an embodiment endplate in relation to an embodiment light fixture and ceiling grid T-bar. The endplate 1407, attaches to the longitudinal end of the elongate fixture body 1401, in this embodiment by means of screws that anchor into screw bosses 1420 in the elongate fixture body. Both the end plate 1407 and the elongate housing 1401 are fastened to a T-bar 103, in this embodiment by use of screws. When the elongate fixture body 1401, optical element 1414, and optically transmissive cover lens component 1416 are manufactured with a continuous length extrusion process, they can easily be cut to length to produce any length needed, for example to fit 1'×2', 1'×4', 1'×8', 2'×2', or 2'×4' ceiling grid cells. Typically, LED boards can are configured so they can be cut to incremental lengths between section of LEDs in series which are commonly 12 LEDS. The light fixture embodiment of FIG. 14A has 2 optical assemblies arranged in parallel at the same height with a configured gap between each. Other embodiments may have multiple optical assemblies arranged at different angles to achieve particular light distributions or aesthetic preferences.

Figure 14B:
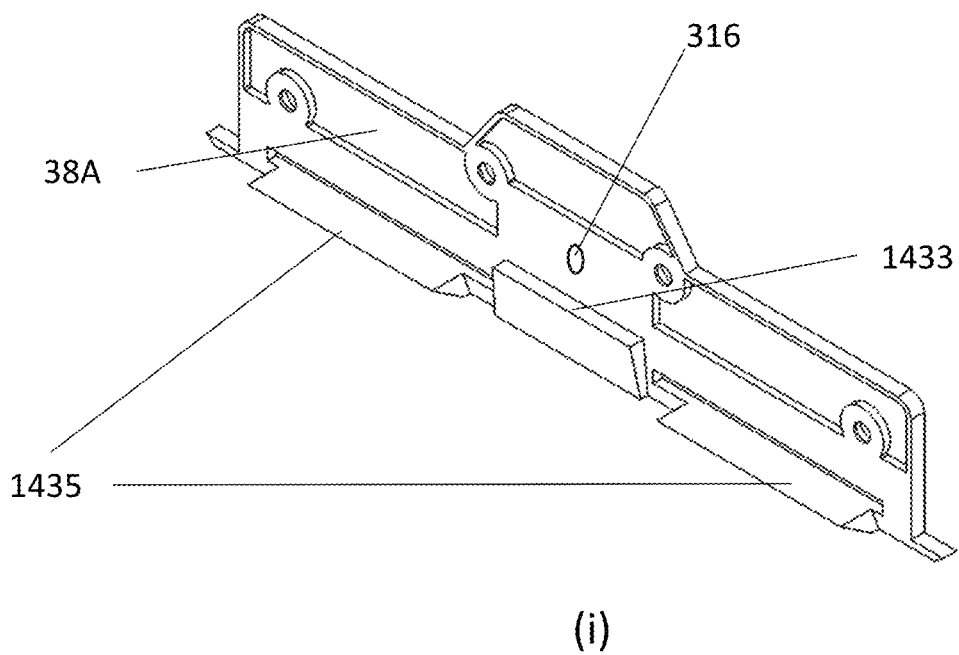
FIG. 14B shows perspective views of the inner (i) and outer (ii) faces of an embodiment end plate.
Figure 14B:
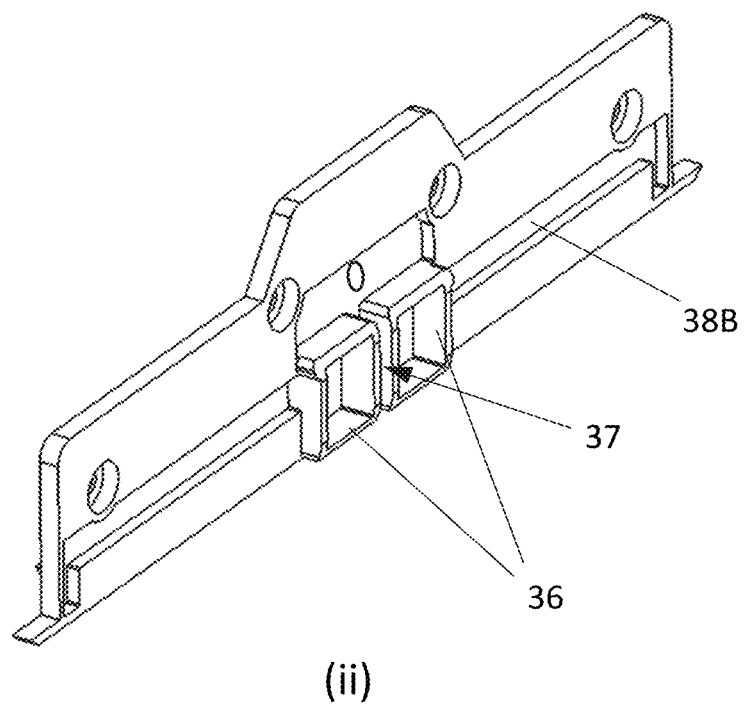

FIG. 14B shows perspective views of the inner (i) and outer (ii) faces of an embodiment end plate having support features and recessed cavities on both faces. An end plate inner support feature 1433 is on the inner face and protrudes into the configured gap in the elongate fixture body upon assembly. The end plate insert plugs 1435 are inserted into optical element zones to form an improved mechanical linkage that functions to block light leakage and also serves as a thermal expansion joint. The inner face of the end plate also contains recessed cavities 1438A which can serve to house electrical wiring, electronic components, and also reduce the mass and weight of the end plate. The outer (ii) face of the embodiment end plate also contains recessed cavities 1438B as well as a gap spacing 1437 for positioning of a T-bar anchor. The spacer features 1436 on the outer face adjust overall thickness of the end plate to position an installed end plate as desired with respect to the edge of a T-bar horizontal portion; for example flush with the edge of a T-bar horizontal portion or slightly more or less depending on particular application.

What is claimed is:

1. A light fixture comprising;
   A) an optical assembly comprising;
      1) An optical element comprising;
         a) a bulk light transmissive material further comprising internal or surface light scattering features;
         b) A 3-dimensional shape comprising;
            (i) at least 4 specific faces, namely; an input face into which light is received, an opposing face non-adjacent to the input face; an inner face adjacent to the input face, an outer face adjacent to the input face, and
            (ii) at least one light emitting output face comprised of at least one outer face or inner face;

2) One least one light source which inputs light into the optical element at an input face;

3) An optically transmitting component which receives and transmits light from an output face of the optical element wherein a portion of the optically transmitting component is an extension of a main portion that covers an input edge portion of the optical element and diffuses light from the optical element output face prior to reaching the main portion of the optically transmissive component; and B) a fixture body with internal features which retain and optically align the light source, optical element and optically transmitting component.

2. The light fixture of claim 1 wherein brightness uniformity of the light fixture is improved vs. the same configuration without the extension portion of the optically transmissive component.

3. The light fixture of claim 1 wherein the extension portion of the optically transmissive component reduces visibility of non-uniformities near the input face of the optical element.

4. The light fixture of claim 1 wherein the extension feature of the optically transmissive component mechanically positions and retains the optical element.

5. The light fixture of claim 1 wherein the extension feature of the optically transmissive component is configured as a prong feature.

6. The light fixture of claim 1 further comprising a reflector positioned adjacent to the opposing face to reflect light emitted from the opposing face back into the optical element.

7. The light fixture of claim 1 wherein the fixture body further comprises a bezel that holds the optically transmissive component in place and covers a portion of the outer perimeter of the optically transmissive component.

8. The light fixture of claim 1 wherein the optical element comprises a single input face which is positioned adjacent to and receiving light from the at least one LED board.

9. The light fixture of claim 1 wherein the optical element is comprised of two input faces, each adjacent to and receiving light from at least one LED board.

10. The light fixture of claim 1 wherein the optical element cross-sectional width varies with cross-sectional height.

11. The light fixture of claim 1 wherein the light distribution output from an external face of the optically transmitting component is different from the light distribution output from the optical element outer face.

12. The light fixture of claim 1 wherein the light distribution output from an external face of the optically transmitting component is less asymmetric than the light output from the outer face of the optical element outer face.

13. The light fixture of claim 1 wherein the optically transmitting component comprises a light scattering region, lenticular pattern, or microlens pattern.

14. The light fixture of claim 13 wherein a light scattering region is a coating or laminated film.

15. The light fixture of claim 13 wherein a light scattering region is comprised of a bulk light transmissive material further comprising dispersed regions of refractive index differing from that of the bulk light transmissive material.

16. The light fixture of claim 13 wherein dispersed regions of refractive index differing from that of the bulk light transmissive material comprise polymer beads.

17. The light fixture of claim 1 wherein the optically transmissive component further comprises features that enable it to be inserted and removed in a snap-in or snap-out process.

18. The light fixture of claim 1 wherein the optically transmissive component is mounted into the fixture body by sliding in from ends of the light fixture.

19. The light fixture of claim 1 wherein the optically transmissive component comprises
A) a light transmissive material with volumetric or surface light scattering features.

20. The light fixture of claim 19 wherein volumetric light scattering features are comprised of regions of light transmissive material dispersed within a bulk matrix material of differing refractive index.

21. The light fixture of claim 20 wherein the regions of light transmissive material dispersed within a bulk material comprise polymer beads.

22. The light fixture of claim 1 wherein the output face of the optically transmissive component is an output face of the light fixture.

23. The light fixture of claim 1 wherein the at least one extension portion is bent or angled at an intersection with the main portion.

24. The light fixture of claim 1 wherein the physical form factor is that of an extruded profile shape.

25. The light fixture of claim 24 configured with features for interlocking with a housing body.

26. The light fixture of claim 25 which can be snapped or slid into place in a housing body.

27. The light fixture of claim 1 wherein the optically transmitting component comprises a light scattering region, lenticular pattern, or microlens pattern.

28. The light fixture of claim 27 wherein a light scattering region is a coating or laminated film.

* * * * *